US012659126B2

(12) United States Patent
Haustein et al.

(10) Patent No.: US 12,659,126 B2
(45) Date of Patent: Jun. 16, 2026

(54) USER EQUIPMENT FOR COMMUNICATION WITH ONE OR MORE WIRELESS NETWORK NODES OVER A WIRELESS NETWORK SIMULTANEOUSLY USING COMPONENT CARRIER GROUPS

(71) Applicant: Fraunhofer-Gesellschaft zur Förderung der angewandten Forschung e.V., Munich (DE)

(72) Inventors: Thomas Haustein, Berlin (DE); Paul Simon Holt Leather, Berlin-Schlachtensee (DE); Mathis Schmieder, Berlin (DE); Ramez Askar, Berlin (DE); Roya Ebrahim Rezagah, Berlin (DE); Jasmina McMenamy, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 672 days.

(21) Appl. No.: 18/168,688

(22) Filed: Feb. 14, 2023

(65) Prior Publication Data

US 2023/0198729 A1 Jun. 22, 2023

Related U.S. Application Data

(63) Continuation of application No. PCT/EP2021/072620, filed on Aug. 13, 2021.

(30) Foreign Application Priority Data

Aug. 14, 2020 (EP) ..................................... 20191192

(51) Int. Cl.
*H04L 5/00* (2006.01)
*H04W 88/06* (2009.01)

(52) U.S. Cl.
CPC .......... *H04L 5/0098* (2013.01); *H04L 5/0053* (2013.01); *H04W 88/06* (2013.01)

(58) Field of Classification Search
CPC ..... H04L 5/0098; H04L 5/0053; H04W 88/06
See application file for complete search history.

(56) References Cited

U.S. PATENT DOCUMENTS

| | | | |
|---|---|---|---|
| 2012/0327797 A1 | 12/2012 | Siomina et al. | |
| 2015/0172987 A1 | 6/2015 | Balakrishnan et al. | |

(Continued)

FOREIGN PATENT DOCUMENTS

| | | |
|---|---|---|
| CN | 102461014 A | 5/2012 |
| CN | 107534963 A | 1/2018 |

(Continued)

OTHER PUBLICATIONS

Ericsson, "3rd Generation Partnership Project; Technical Specification Group Radio Access Network; NR; Radio Resource Control (RRC) protocol specification", WG2 Meeting #110 R2-2005881, Electronic meeting, Jun. 1-12, 2020.

(Continued)

*Primary Examiner* — Jackie Zuniga Abad

(74) *Attorney, Agent, or Firm* — Bridgeway IP Law Group, PLLC; Jihun Kim

(57) ABSTRACT

User equipment and methods for communication over a wireless network are described. According to one embodiment, the user equipment is configured for exchanging portions of signaling data exclusively over primary component carriers in a first mode in a first phase; for exchanging a portion of the signaling data of a selected primary component carrier of the primary component carriers of a first component carrier group simultaneously over the selected primary component carrier and a selected secondary component carrier of secondary component carriers of a second (Continued)

master node (MN)

user equipment component carrier group in a second mode in a second phase subsequent to the first phase, the second phase being initiated in case a first trigger condition occurs; and for using the selected secondary component carrier from the second phase in a third mode in a third phase subsequent to the second phase as one of the primary component carriers.

19 Claims, 8 Drawing Sheets

(56) References Cited

U.S. PATENT DOCUMENTS

| | | | |
|---|---|---|---|
| 2015/0230268 A1 | 8/2015 | Chen et al. | |
| 2016/0127055 A1 | 5/2016 | Dayal et al. | |
| 2016/0302203 A1 | 10/2016 | Liu et al. | |
| 2018/0049184 A1* | 2/2018 | Lee | H04W 72/21 |
| 2020/0120694 A1 | 4/2020 | Eklöf et al. | |
| 2020/0351638 A1 | 11/2020 | Kim et al. | |
| 2021/0058837 A1* | 2/2021 | Cirik | H04B 7/0696 |
| 2021/0203468 A1* | 7/2021 | Yi | H04W 72/0453 |
| 2021/0250833 A1* | 8/2021 | Ioffe | H04W 36/14 |

FOREIGN PATENT DOCUMENTS

| | | |
|---|---|---|
| CN | 109792740 A | 5/2019 |
| CN | 111345050 A | 6/2020 |
| JP | 2018137795 A | 8/2018 |
| KR | 10-2016-0122166 A | 10/2016 |
| WO | 2010129223 A2 | 11/2010 |
| WO | 2014/109606 A1 | 7/2014 |
| WO | 2016/144651 A1 | 9/2016 |
| WO | 2021/069625 A1 | 4/2021 |

OTHER PUBLICATIONS

"Notice of Allowance for KR Application No. 10-2023-7008765", May 28, 2024, KIPO, Republic of Korea.
3GPP TS 38.300 V15.0.0 (Dec. 2017).
3GPP TS 38.213 V15.0.0 (Dec. 2017).
3GPP TS 38.321 V15.0.0 (Dec. 2017).
3GPP TS 38.300 V16.2.0 (Jul. 2020).
3GPP TS 38.213 V16.1.0 (Mar. 2020).
3GPP TS 38.321 V16.0.0 (Mar. 2020).
3GPP TS 37.340 V16.1.0 (Mar. 2020).
3GPP TS 38.331 V16.0.0 (Mar. 2020).
3GPP TS 38.101-1 V16.2:0 (Dec. 2019).
3GPP TS 38.533 V16.2.0 (Dec. 2019).
Erik Dahlman et al., LTE Radio Access: An Overview, "4G: LTE/LTE-Advanced for Mobile Broadband", 1st. ed. Academic Press, Inc., USA, 2011.
Erik Dahlman et al., Radio-Interface Architecture, "4G: LTE/LTE-Advanced for Mobile Broadband", 1st. ed. Academic Press, Inc., USA, 2011.
Erik Dahlman et al., Physical Transmission Resources, "4G: LTE/LTE-Advanced for Mobile Broadband", 1st. ed. Academic Press, Inc., USA, 2011.
Erik Dahlman et al., Spectrum and RF Characteristics, "4G: LTE/LTE-Advanced for Mobile Broadband", 1st. ed. Academic Press, Inc., USA, 2011.
Erik Dahlman et al., Spectrum for 5G, "5G NR: The Next Generation Wireless Access Technology", 1st. ed., Academic Press, Inc., USA, 2018.
Erik Dahlman et al., Radio-Interface Architecture, "5G NR: The Next Generation Wireless Access Technology", 1st. ed., Academic Press, Inc., USA, 2018.

Erik Dahlman et al., Overall Transmission Structure, "5G NR: The Next Generation Wireless Access Technology", 1st. ed., Academic Press, Inc., USA, 2018.
Erik Dahlman et al., Channel Sounding, "5G NR: The Next Generation Wireless Access Technology", 1st. ed., Academic Press, Inc., USA, 2018.
Erik Dahlman et al., Physical-Layer Control Signalling, "5G NR: The Next Generation Wireless Access Technology", 1st. ed., Academic Press, Inc., USA, 2018.
Erik Dahlman et al., Retransmission Protocols, "5G NR: The Next Generation Wireless Access Technology", 1st. ed., Academic Press, Inc., USA, 2018.
Erik Dahlman et al., Scheduling, "5G NR: The Next Generation Wireless Access Technology", 1st. ed., Academic Press, Inc., USA, 2018.
A. Zaidi et al., "5G Physical Layer: Principles, Models and Technology Components", 1st. ed., Academic Press, Inc., USA, 2018.
K. Takeda et al., "Understanding the Heart of the 5G Air Interface: An Overview of Physical Downlink Control Channel for 5G New Radio (NR)," May 2019.
S. Ahmadi, 5G NR, New Radio Access Layer 2/3 Aspects and System Operation, "Architecture, Technology, Implementation, and Operation of 3GPP New Radio Standards.", Academic Press, 2019.
S. Ahmadi, New Radio Access Physical Layer Aspects (Part 1), "Architecture, Technology, Implementation, and Operation of 3GPP New Radio Standards", Academic Press, 2019.
S. Ahmadi, New Radio Access Physical Layer Aspects (Part 2), "Architecture, Technology, Implementation, and Operation of 3GPP New Radio Standards", Academic Press, 2019.
S. Ahmadi, 5G NR, Operation in Unlicensed and Shared Spectrum, "Architecture, Technology, Implementation, and Operation of 3GPP New Radio Standards.", Academic Press, 2019.
A. Aijaz, "Packet Duplication in Dual Connectivity Enabled 5G Wireless Networks: Overview and Challenges," IEEE Communications Standards Magazine, pp. 20-28, 2019.
S. Lagen et al., "New Radio Beam-Based Access to Unlicensed Spectrum: Design Challenges and Solutions," IEEE Communications Surveys & Tutorial, pp. 8-37, 2020.
Ericsson, "3GPP TSG-RAN WG2 #107bis R2-1913296 Summary of email discussion 107#31 NR DCCA Fast MCG Recovery", 2019, Chongqing, China, Oct. 14-18, 2019.
Ericsson, "3GPP TSG-RAN WG2 #107 R2-1910273 Fast MCG Recovery via SCells", Prague, Czech Republic, Aug. 26-30, 2019.
Nokia, "3GPP TSG-RAN WG2 Meeting #106 R2-1909111 NR DCCA Fast Recovery with CA", Prague, Czech Republic, Aug. 26-30, 2019.
Ericsson et al., "3GPP TSG-RAN#84 RP-191600 Revised WID: Multi-RAT Dual-Connectivity and Carrier Aggregation enhancements", Newport Beach, CA, USA, Jun. 3-6, 2019.
Huawei, "3GPP TSG RAN Meeting #86 RP-193249 New WID on further enhancements on Multi-Radio Dual-Connectivity", Sitges, Spain, Dec. 9-12, 2019.
S. Ahmadi, LTE-Advanced. A Practical Systems Approach to Understanding 3GPP LTE Releases 10 and 11, Access Technologies (1st ed.), 2013, Academic Press, Inc. USA.
Ericsson Blog, "Reducing mobility interruption time in 5G networks", Apr. 2, 2020 [Online]. Available: https://www.ericsson.com/en/blog/2020/4/reducing-mobility-interruption-time-5g-networks.
Abhay Karandikar et al. "Mobility Management in LTE Heterogeneous Networks", Springer Nature Singapore Pte Lte, 2017.
Mihai Enescu, "5G New Radio, A Beam-Based Air Interface", John Wiley & Sons Ltd, 2020.
5G Technology World, Available: https://www.5gtechnologyworld.com/how-5g-changes-the-v2x-communications-game/.

* cited by examiner

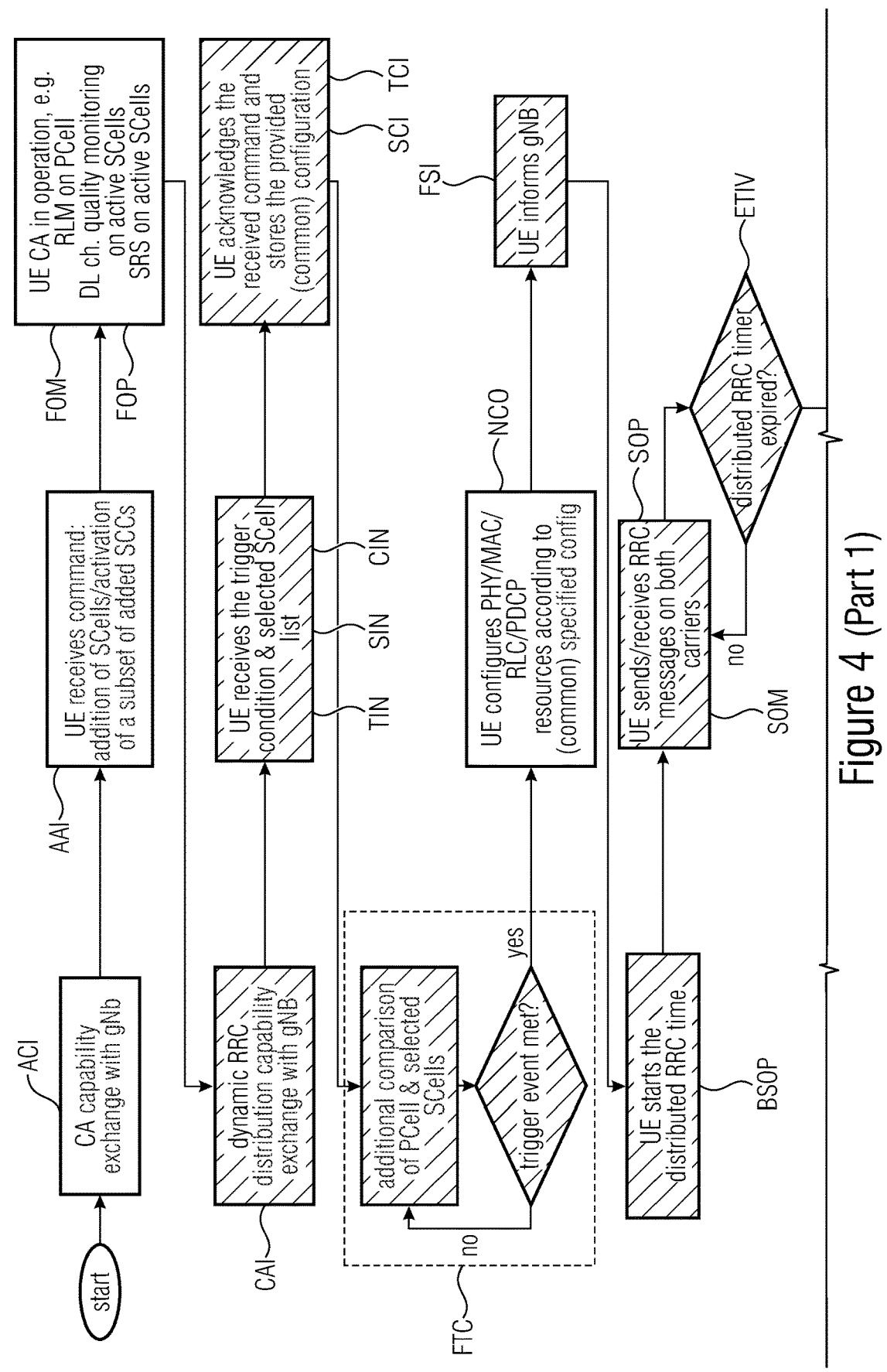
Figure 4 (Part 1)

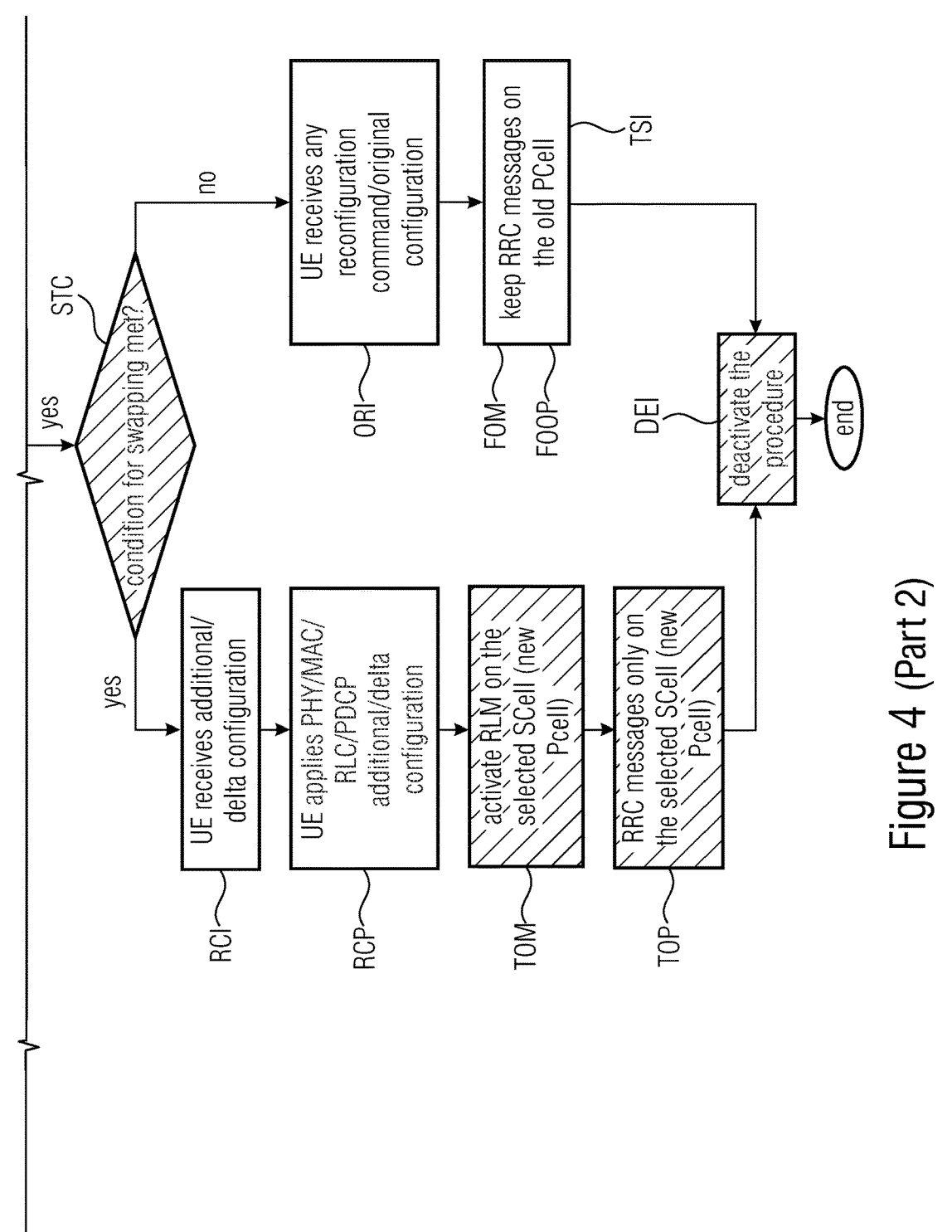
Figure 4 (Part 2)

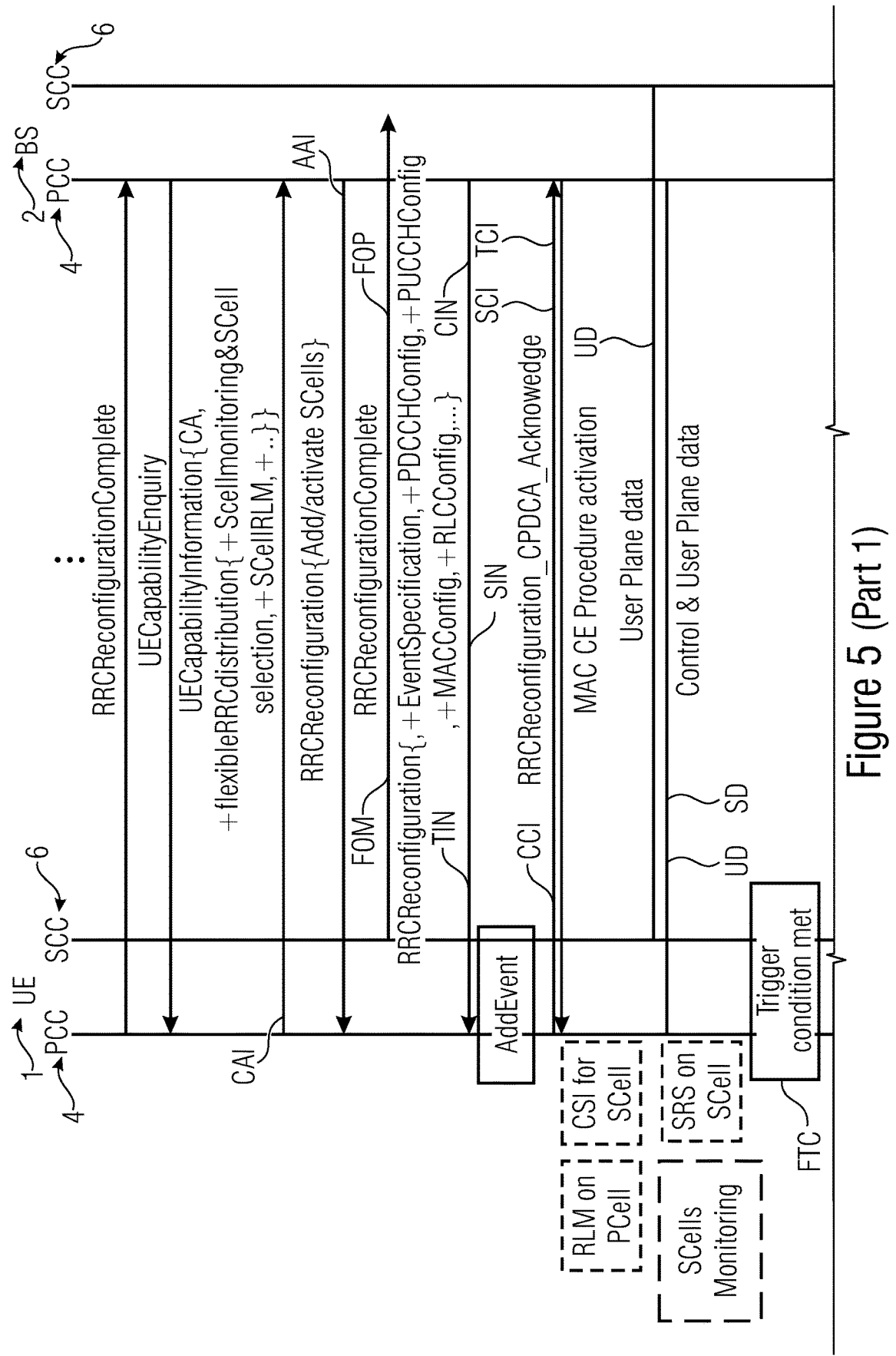
Figure 5 (Part 1)

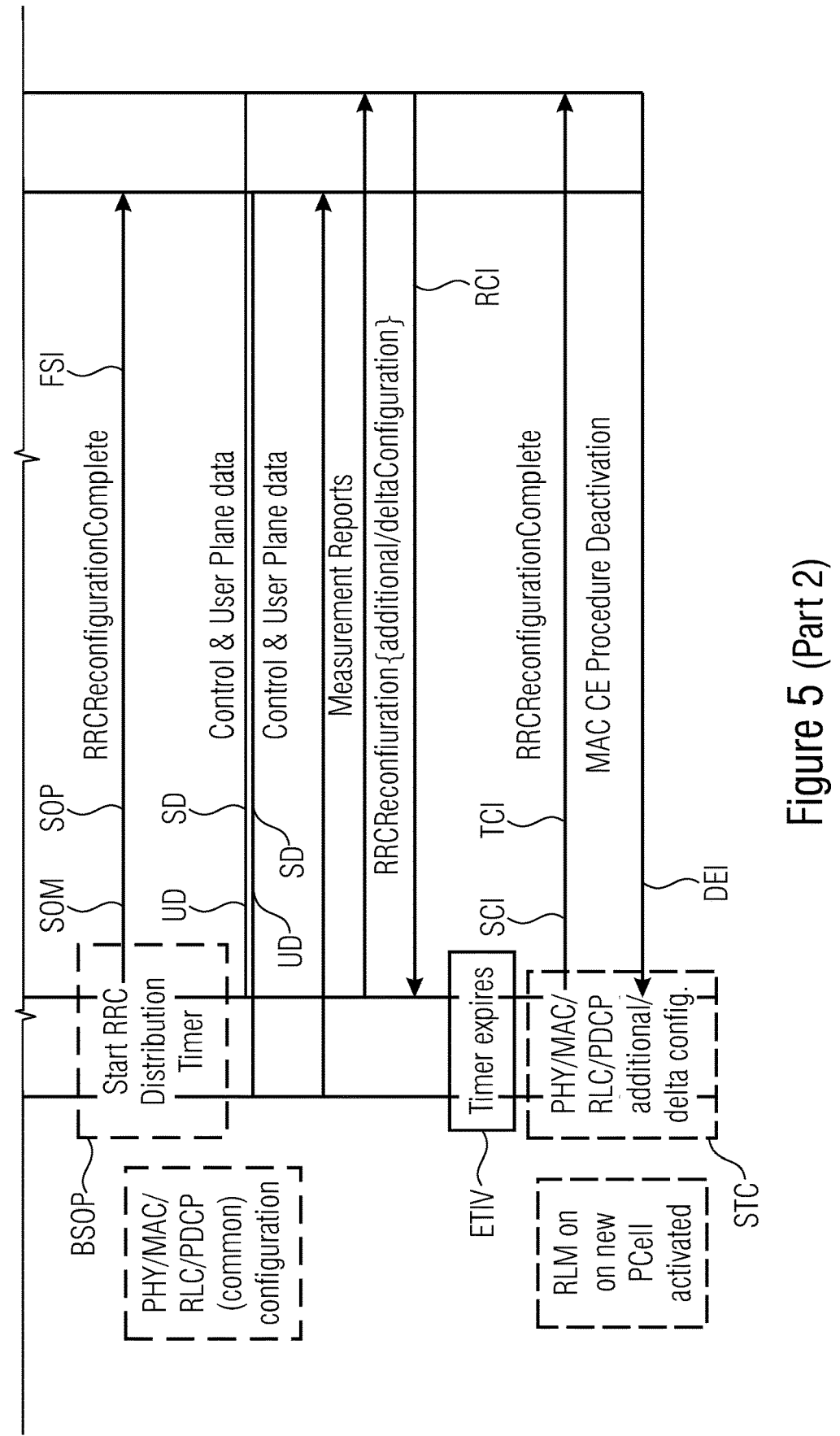
Figure 5 (Part 2)

USER EQUIPMENT FOR COMMUNICATION WITH ONE OR MORE WIRELESS NETWORK NODES OVER A WIRELESS NETWORK SIMULTANEOUSLY USING COMPONENT CARRIER GROUPS

CROSS-REFERENCE TO RELATED APPLICATIONS

This application is a continuation of copending International Application No. PCT/EP2021/072620, filed Aug. 13, 2021, which is incorporated herein by reference in its entirety, and additionally claims priority from European Application No. 20191192.2, filed Aug. 14, 2020, which is also incorporated herein by reference in its entirety.

TECHNICAL FIELD

The invention relates to radio access technologies. In particular, the invention relates to a user equipment for communication over a wireless network and a wireless network node for connecting the user equipment to the wireless network.

SUMMARY

An embodiment may have a user equipment for communication over a wireless network; wherein the user equipment is configured for communicating with one or more wireless network nodes of the wireless network simultaneously over a first component carrier group having one or more primary component carriers and over a second component carrier group having one or more secondary component carriers; wherein the user equipment is configured for exchanging portions of signalling data over each of the primary component carriers and portions of user data over each of the primary component carriers and over each of the secondary component carriers with the one or more wireless network nodes; wherein the user equipment is configured for communicating with the one or more wireless network nodes of the wireless network using different operational modes; wherein the user equipment is configured for exchanging the portions of the signalling data exclusively over the primary component carriers in a first operational mode of the operational modes in a first operational phase; wherein the user equipment is configured for exchanging the portion of the signalling data of a selected primary component carrier of the primary component carrier of the first component carrier group simultaneously over the selected primary component carrier and over a selected secondary component carrier of the secondary component carriers of the second component carrier group in a second operational mode of the operational modes in a second operational phase subsequent to the first operational phase, wherein the second operational phase is initiated in case that a first trigger condition occurs; wherein the user equipment is configured for using the selected secondary component carrier from the second operational phase in a third operational mode of the operational modes in a third operational phase subsequent to the second operational phase as one of the primary component carriers, so that the selected secondary component carrier from the second operational phase is added to the primary component carriers of the first component carrier group and removed from secondary component carriers of the second component carrier group in the third operational phase, wherein the third operational phase is initiated in case that a second trigger condition occurs.

Another embodiment may have a method for operating a user equipment for communication over a wireless network; wherein the user equipment is configured for communicating with one or more wireless network nodes of the wireless network simultaneously over a first component carrier group having one or more primary component carriers and over a second component carrier group having one or more secondary component carriers; wherein the user equipment is configured for communicating with the one or more wireless network nodes of the wireless network using different operational modes; wherein the user equipment is configured for exchanging portions of signalling data over each of the primary component carriers and portions of user data over each of the primary component carriers and over each of the secondary component carriers with the one or more wireless network nodes; the method having the steps: operating the user equipment in a first operational mode of the operational modes in a first operational phase, wherein in the first operational mode the portions of the signalling data are exclusively exchanged over the primary component carriers; operating the user equipment in a second operational mode of the operational modes in a second operational phase subsequent to the first operational phase, wherein in the second operational mode the portion of the signalling data of a selected primary component carrier of the primary component carriers of the first component carrier group is simultaneously exchanged over the selected primary component carrier and over a selected secondary component carrier of the secondary component carriers of the second component carrier group, wherein the second operational phase is initiated in case that a first trigger condition occurs; operating the user equipment in a third operational mode of the operational modes in a third operational phase subsequent to the second operational phase, wherein in the third operational mode the selected secondary component carrier from the second operational phase is used as one of the primary component carriers, so that the selected secondary component carrier from the second operational phase is added to the primary component carriers of the first component carrier group and removed from secondary component carriers of the second component carrier group in the third operational phase, wherein the third operational phase is initiated in case that a second trigger condition occurs.

Another embodiment may have a non-transitory digital storage medium having stored thereon a computer program for performing an inventive method for operating a user equipment for communication over a wireless network, when said computer program is run by a computer.

Another embodiment may have a wireless network node for connecting a user equipment for communication over a wireless network to the wireless network; wherein the wireless network node is configured for communicating with the user equipment simultaneously over a first component carrier group having one or more primary component carriers and over a second component carrier group having one or more secondary component carriers; wherein the wireless network node is configured for communicating with the user equipment using different operational modes; wherein the wireless network node is configured for exchanging portions of signalling data over each of the primary component carriers and portions of user data over each of the primary component carriers and over each of the secondary component carriers with the user equipment; wherein the wireless network node is configured for exchanging the portions of the signalling data exclusively over the primary component carriers in a first operational mode of the operational modes in a first operational phase; wherein the wireless network node is configured for exchanging the portion of the signalling data of a selected primary component carrier of the primary component carriers of the first component carrier group simultaneously over the selected primary component carrier and over a selected secondary component carrier of the secondary component carriers of the second component carrier group in a second operational mode of the operational modes in a second operational phase subsequent to the first operational phase, wherein the second operational phase is initiated in case that a first trigger condition occurs; wherein the wireless network node is configured for using the selected secondary component carrier from the second operational phase in a third operational mode of the operational modes in a third operational phase subsequent to the second operational phase as one of the primary component carriers, so that the selected secondary component carrier from the second operational phase is added to the primary component carriers of the first component carrier group and removed from secondary component carriers of the second component carrier group in the third operational phase, wherein the third operational phase is initiated in case that a second trigger condition occurs.

Another embodiment may have a method for operating a wireless network node for connecting a user equipment for communication over a wireless network to the wireless network; wherein the wireless network node is configured for communicating with the user equipment simultaneously over a first component carrier group having one or more primary component carriers and over a second component carrier group having one or more secondary component carriers; wherein the wireless network node is configured for communicating with the user equipment using different operational modes; wherein the wireless network node is configured for exchanging portions of signalling data over each of the primary component carriers and portions of user data over each of the primary component carriers and over each of the secondary component carriers with the user equipment; the method having the steps: operating the wireless network node in a first operational mode of the operational modes in a first operational phase, wherein in the first operational mode the portions of the signalling data are exclusively exchanged over the primary component carriers; operating the wireless network node in a second operational mode of the operational modes in a second operational phase subsequent to the first operational phase, wherein in the second operational mode the portion of the signalling data of a selected primary component carrier of the primary component carriers of the first component carrier group is simultaneously exchanged over the selected primary component carrier and over a selected secondary component carrier of the secondary component carriers of the second component carrier group, wherein the second operational phase is initiated in case that a first trigger condition occurs; operating the wireless network node in a third operational mode of the operational modes in a third operational phase subsequent to the second operational phase, wherein in the third operational mode the selected secondary component carrier from the second operational phase is used as one of the primary component carriers, so that the selected secondary component carrier from the second operational phase is added to the primary component carriers of the first component carrier group and removed from secondary component carriers of the second component carrier group in the third operational phase, wherein the third operational phase is initiated in case that a second trigger condition occurs.

Still another embodiment may have a non-transitory digital storage medium having stored thereon a computer program for performing an inventive method for operating a wireless network node for connecting a user equipment for communication over a wireless network to the wireless network, when said computer program is run by a computer.

Provided is a user equipment for communication over a wireless network;

wherein the user equipment is configured for communicating with one or more wireless network nodes of the wireless network simultaneously over a first component carrier group comprising one or more primary component carriers and over a second component carrier group comprising one or more secondary component carriers;

wherein the user equipment is configured for exchanging portions of signalling data over each of the primary component carriers and portions of user data over each of the primary component carriers and over each of the secondary component carriers with the one or more wireless network nodes;

wherein the user equipment is configured for communicating with the one or more wireless network nodes of the wireless network using different operational modes;

wherein the user equipment is configured for exchanging the portions of the signalling data exclusively over the primary component carriers in a first operational mode of the operational modes in a first operational phase wherein the user equipment is configured for exchanging the portion of the signalling data of a selected primary component carrier of the primary component carriers of the first component carrier group simultaneously over the selected primary component carrier and over a selected secondary component carrier of the secondary component carriers of the second component carrier group in a second operational mode of the operational modes in a second operational phase subsequent to the first operational phase, wherein the second operational phase is initiated in case that a first trigger condition occurs;

wherein the user equipment is configured for using the selected secondary component carrier from the second operational phase in a third operational mode of the operational modes in a third operational phase subsequent to the second operational phase as one of the primary component carriers, so that the selected secondary component carrier from the second operational phase is added to the primary component carriers of the first component carrier group and removed from secondary component carriers of the second component carrier group in the third operational phase, wherein the third operational phase is initiated in case that a second trigger condition occurs.

The wireless network may be any network capable of exchanging data, such as real-time data, streaming data or file-based data, wherein the data connection between the user equipment and wireless network node is a wireless data connection. In some embodiments, the network is a cellular network using 4G LTE, 5G NR or other cellular network technology. In other embodiments, the network is a local network using Wi-Fi technology or the like.

A component carrier is a frequency range over which data are exchanged between the user equipment and one of the network nodes of the wireless network. A component carrier may carry uplink data (data transmitted from user equipment to the wireless network node) and downlink data (data transmitted from the wireless network node to the user equipment) at the same frequency range. In other embodiments a component carrier may comprise a first frequency subrange for uplink data and a second frequency subrange for downlink data, wherein the frequency subranges may be spaced from each other or adjacent to each other.

A connection between the user equipment and wireless network node, which is using more than one component carrier, is also referred to as carrier aggregation. Carrier aggregation allows a faster data transfer.

Signalling data can be control plane messages used to manage the connection between the user equipment and the wireless network nodes, including but not limited to mobility management, measurement configuration and reporting, and handling of device capability. User data of the part of the transmitted data that are the actual data of interest are exchanged between the user equipment and the wireless network node.

A primary component carrier is a component carrier over which signalling data are exchanged, which are used for coordinating the connection between the user equipment and the wireless network nodes. All other component carriers are secondary component carriers. The connection can comprise of a number of links over component carriers.

The term "operational phase" refers to a time interval, whereas the term "operational mode" refers to a method of operation. The user equipment according to invention is configured for communicating with the one or more wireless network nodes of the wireless network using different operational modes. It is obvious, that it is essential, that at least one of the wireless network nodes needs to be configured for communicating with the user equipment using the same operational modes. In other words, one of the different operational modes can only be used, if both the user equipment and the wireless network node are capable of using it.

In a first operational mode, which is used at least during a portion of a first operational phase, the signalling data are only exchanged over the first component carrier group, whereas user data are exchanged in part of the first component carrier group and in part over the second component carrier group.

In a second operational mode, which is used at least during a portion of the second operational phase, the signalling data of the selected primary component carrier are additionally transferred to a selected secondary component carrier. The second operational phase is initiated, if a first trigger condition occurs. The first trigger condition in general indicates that the selected primary component carrier is degrading in terms of physical quality. In a second operational mode, the connection is still managed by the signalling data transferred over the selected primary component carrier. This means that in the second operational mode the signalling data exchanged over the selected secondary component carrier remain unused.

However, if a second trigger condition occurs, a third operational phase is initiated, and the signalling data exchanged over the selected secondary component carrier are immediately available for a third operational mode, in which the selected secondary component carrier becomes a primary component carrier over which the connection is managed by using the signalling data exchanged over the new primary component carrier. The second trigger condition also indicates that the selected primary component carrier is degrading in terms of physical quality. The first trigger condition and the second trigger condition may be the same trigger condition or different trigger conditions.

In known radio network access technologies using carrier aggregation, the connection between user equipment and the wireless network node is completely lost and needs to be reestablished in case that the primary component carrier physically degrades or is lost, even if the secondary component carrier is fully available. This is because the signalling data are completely lost in such a scenario. Reasons for losing the primary component carrier include suffering from blockage, multipath selective fading, or beam peak misalignment from which a link cannot recover using the available link recovery mechanisms.

In contrast to that, the invention allows to transfer the primary component functionality from a selected primary component carrier to a selected secondary component carrier, which then becomes a primary component carrier. As a result, the data transfer will not be interrupted.

The invention enables a more flexible mapping of primary component functionality on available component carriers.

It allows swapping of control plane data between a primary component carrier and a secondary component carrier without releasing and adding the secondary component carrier in the carrier aggregation configuration.

Swapping primary component carrier functionality in terms of carrying the control plane part is more efficient in terms of bandwidth than carrier aggregation duplication as it provides a configurable period in which to duplicate control plane data and hence is suitable for variety of use cases, in addition to URLLC use cases. It also avoids fluctuations in the user plane bandwidth by protecting the control plane function performed by the primary component carrier for different use cases.

Furthermore, the invention provides a reduction of handover time of aggregated carrier and resilience in multi-link connectivity scenarios, where the overall link availability and coordination is prone to the degradation or loss of the signalling data of the primary component carrier.

The user equipment may be configured for selecting the secondary component carrier from a set of the selected secondary component carriers of the second component carrier group in a second operational mode of the operational modes in a second operational phase subsequent to the first operational phase, wherein the second operational phase is initiated in case that a first trigger condition occurs.

According to some embodiments, the user equipment is configured for using the selected primary component carrier from the second operational phase in the third operational mode in the third operational phase as one of the secondary component carriers, so that the selected primary component carrier from the second operational phase is added to the secondary component carriers of the second component carrier group and removed from primary component carriers of the first component carrier group in the third operational phase. By these features, the initial bandwidth from the first operational phase may be maintained in the referred operational phase, in case that the selected primary component carrier from the second operational phase remains available in the referred operational phase.

According to some embodiments, the first trigger condition and/or the second trigger condition relate to a physical quality of at least some of the primary component carriers and/or to a physical quality of at least some of the secondary component carriers. The component carriers available in the first operational mode or second operational mode may be rated according to several metrics, including their adopted statistical measures wherein the first trigger condition and/or the second trigger condition may be defined on the basis of such metrics, again, including their adopted statistical measures.

The following non-exhaustive list summarizes examples for metrics:

signal to noise ratio (SNR),
    signal to interference and noise ratio (SINR),
    reference signal received power (RSRP),
    reference signal received quality (RSRQ),
    angular spread of the component carriers,
    small-scale fading effects,
    temporal behaviour of the channel,
    bit error rate (BER),
    packet loss (PL),
    packet error rate (PER),
    trigger from the wireless network node, network or configured in the user equipment.

According to some embodiments, the user equipment is configured for transmitting a capability information to one of the wireless network nodes in the first operational phase over one of the primary component carriers, wherein the capability information indicates that the user equipment is capable of operating in the second operational mode and in the third operational mode. These features ensure that a second operational phase is initiated only in such cases, in which the user equipment is configured according to the invention.

According to some embodiments, the user equipment is configured for receiving a trigger information from one of the wireless network nodes in the first operational phase over one of the primary component carriers, wherein the trigger information indicates the first trigger condition and/or the second trigger condition. These features ensure that the first trigger condition and/or the second trigger condition are suitable for the present configuration of the available wireless network nodes.

According to some embodiments, the user equipment is configured for transmitting a trigger confirmation information to one of the wireless network nodes in the first operational phase over one of the primary component carriers, wherein the trigger confirmation information indicates that the trigger information has been received by the user equipment. These features allow, that the wireless network node retransmits the trigger information in case that the user equipment does not acknowledge that it has received the trigger conditions.

According to some embodiments, the user equipment is configured for receiving a selection information from one of the wireless network nodes in the first operational phase over one of the primary component carriers, wherein the selection information indicates which of the secondary component carriers of the second component carrier group is the selected secondary component carrier for the second operational mode or wherein the selection information indicates conditions for selecting the selected secondary component carrier for the second operational mode. These features ensure that the selection of the selected primary component carrier and/or the selection of the selected secondary component carrier are suitable for the present configuration of the available wireless network nodes.

According to some embodiments, the user equipment is configured for transmitting a selection confirmation information to one of the wireless network nodes in the first operational phase over one of the primary component carriers, wherein the selection confirmation information indicates that the selection information has been received by the user equipment. These features allow, that the wireless network node retransmits the selection information in case that the user equipment does not acknowledge that it has received the selection information.

According to some embodiments, the user equipment is configured for receiving a configuration information from one of the wireless network nodes in the first operational phase over one of the primary component carriers, wherein the configuration information indicates a configuration of the selected secondary component carrier for the second operational mode. These features ensure that the required configuration information is available at the user equipment.

According to some embodiments, the user equipment is configured for transmitting a configuration confirmation information to one of the wireless network nodes in the first operational phase over one of the primary component carriers, wherein the configuration confirmation information indicates that the configuration information has been received by the user equipment.

According to some embodiments, the user equipment is configured for detecting an occurrence of the first trigger condition in the first operational phase and, in case that the occurrence of the first trigger condition is detected, for initiating the second operational phase by switching to the second operational mode and by transmitting a first switching information to one of the wireless network nodes over one of the primary component carriers, wherein the first switching information indicates that the user equipment is in the second operational mode. These features allow that the wireless network node may initiate the second operational mode at the same time as the user equipment does, so that the second operational mode can be established.

According to some embodiments, the user equipment is configured for detecting an occurrence of the second trigger condition in the second operational phase at an end of a time interval starting at a beginning of the second operational phase. The time interval may be predefined and measured by a clock of the user equipment.

The time interval defines the duration of the second operational phase. The time interval should be at least as long as it takes to transfer all necessary user data over selected secondary component carrier, so that at the start of the third operational phase the necessary user data are available at the selected secondary component carrier so that the selected component carrier may take over the primary component functionality without delay. The time interval may ensure that unnecessary switching of the primary component functionality is avoided in case that the selected primary component carrier has degraded only for a short time interval.

According to some embodiments, the user equipment is configured, in case that the occurrence of the second trigger condition is detected at the end of the time interval, for initiating the third operational phase by switching to the third operational mode and by transmitting a second switching information to one of the wireless network nodes over one of the primary component carriers, wherein the second switching information indicates that the user equipment is in the third operational mode. These features allow that the wireless network node may initiate the third operational mode at the same time as the user equipment does, so that the third operational mode can be established.

According to some embodiments, the user equipment is configured, in case that the occurrence of the second trigger condition is not detected at the end of the time interval, for initiating a fourth operational phase subsequent to the second operational phase by switching to the first operational mode and by transmitting a third switching information to one of the wireless network nodes over one of the primary component carriers, wherein the third switching information indicates that the user equipment is in the first operational mode. These features ensure that the first mode of operation is reestablished in case that a handover of the primary component functionality is not necessary.

In a further aspect a method for operating a user equipment for communication over a wireless network is provided;

wherein the user equipment is configured for communicating with one or more wireless network nodes of the wireless network simultaneously over a first component carrier group comprising one or more primary component carriers and over a second component carrier group comprising one or more secondary component carriers;

wherein the user equipment is configured for communicating with the one or more wireless network nodes of the wireless network using different operational modes;

wherein the user equipment is configured for exchanging portions of signalling data over each of the primary component carriers and portions of user data over each of the primary component carriers and over each of the secondary component carriers with the one or more wireless network nodes;

the method comprising the steps:

operating the user equipment in a first operational mode of the operational modes in a first operational phase, wherein in the first operational mode the portions of the signalling data are exclusively exchanged over the primary component carriers;

operating the user equipment in a second operational mode of the operational modes in a second operational phase subsequent to the first operational phase, wherein in the second operational mode the portion of the signalling data of a selected primary component carrier of the primary component carriers of the first component carrier group is simultaneously exchanged over the selected primary component carrier and over a selected secondary component carrier of the secondary component carriers of the second component carrier group, wherein the second operational phase is initiated in case that a first trigger condition occurs;

operating the user equipment in a third operational mode of the operational modes in a third operational phase subsequent to the second operational phase, wherein in the third operational mode the selected secondary component carrier from the second operational phase is used as one of the primary component carriers, so that the selected secondary component carrier from the second operational phase is added to the primary component carriers of the first component carrier group and removed from secondary component carriers of the second component carrier group in the third operational phase, wherein the third operational phase is initiated in case that a second trigger condition occurs.

In a further aspect, a computer program for, when running on a processor, executing the method described herein is provided.

In a further aspect, a wireless network node for connecting a user equipment for communication over a wireless network to the wireless network is provided;

wherein the wireless network node is configured for communicating with the user equipment simultaneously over a first component carrier group comprising one or more primary component carriers and over a second component carrier group comprising one or more secondary component carriers;

wherein the wireless network node is configured for communicating with the user equipment using different operational modes;

wherein the wireless network node is configured for exchanging portions of signalling data over each of the primary component carriers and portions of user data over each of the primary component carriers and over each of the secondary component carriers with the user equipment;

wherein the wireless network node is configured for exchanging the portions of the signalling data exclusively over the primary component carriers in a first operational mode of the operational modes in a first operational phase;

wherein the wireless network node is configured for exchanging the portion of the signalling data of a selected primary component carrier of the primary component carriers of the first component carrier group simultaneously over the selected primary component carrier and over a selected secondary component carrier of the secondary component carriers of the second component carrier group in a second operational mode of the operational modes in a second operational phase subsequent to the first operational phase, wherein the second operational phase is initiated in case that a first trigger condition occurs;

wherein the wireless network node is configured for using the selected secondary component carrier from the second operational phase in a third operational mode of the operational modes in a third operational phase subsequent to the second operational phase as one of the primary component carriers, so that the selected secondary component carrier from the second operational phase is added to the primary component carriers of the first component carrier group and removed from secondary component carriers of the second component carrier group in the third operational phase, wherein the third operational phase is initiated in case that a second trigger condition occurs.

The wireless network node according to the invention is configured to cooperate with the user equipment according to the invention. All definitions and explanations given above regarding the user equipment are also valid with respect to the wireless network node. The wireless network node according to the invention provides the advantages as outlined above.

According to some embodiments, the wireless network node is configured for using the selected primary component carrier from the second operational phase in the third operational mode in the third operational phase as one of the secondary component carriers, so that the selected primary component carrier from the second operational phase is added to the secondary component carriers of the second component carrier group and removed from primary component carriers of the first component carrier group in the third operational phase.

According to some embodiments, the first trigger condition and/or the second trigger condition relate to a physical quality of at least some of the primary component carriers and/or to a physical quality of at least some of the secondary component carriers.

According to some embodiments, the wireless network node is configured for receiving a capability information from the user equipment in the first operational phase over one of the primary component carriers, wherein the capability information indicates that the user equipment is capable of operating in the second operational mode and in the third operational mode.

According to some embodiments, the wireless network node is configured for transmitting a trigger information to the user equipment in the first operational phase over one of the primary component carriers, wherein the trigger information indicates the first trigger condition and/or the second trigger condition.

According to some embodiments, the wireless network node is configured for receiving a trigger confirmation information from the user equipment in the first operational phase over one of the primary component carriers, wherein the trigger confirmation information indicates that the trigger information has been received by the user equipment.

According to some embodiments, the wireless network node is configured for transmitting a selection information to the user equipment in the first operational phase over one of the primary component carriers, wherein the selection information indicates which of the secondary component carriers of the second component carrier group is the selected secondary component carrier for the second operational mode or wherein the selection information indicates conditions for selecting the selected secondary component carrier for the second operational mode.

According to some embodiments, the wireless network node is configured for receiving a selection confirmation information from the user equipment in the first operational phase over one of the primary component carriers, wherein the selection confirmation information indicates that the selection information has been received by the user equipment.

According to some embodiments, the wireless network node is configured for transmitting a configuration information to the user equipment in the first operational phase over one of the primary component carriers, wherein the configuration information indicates a configuration of the selected secondary component carrier for the second operational mode.

According to some embodiments, the wireless network node is configured for receiving a configuration confirmation information from the user equipment in the first operational phase over one of the primary component carriers, wherein the selection confirmation information indicates that the configuration information has been received by the user equipment.

According to some embodiments, the wireless network node is configured for switching to the second operational mode after receiving a first switching information from the user equipment over one of the primary component carriers, wherein the first switching information indicates that the user equipment is in the second operational mode.

According to some embodiments, the wireless network node is configured for switching to the third operational mode after receiving a second switching information from the user equipment over one of the primary component carriers, wherein the second switching information indicates that the user equipment is in the third operational mode.

According to some embodiments, the wireless network node is configured for switching to the first operational mode in a fourth operational phase subsequent to the second operational phase after receiving a third switching information from the user equipment over one of the primary component carriers, wherein the third switching information indicates that the user equipment is in the first operational mode.

In a further aspect, a method for operating a wireless network node for connecting a user equipment for communication over a wireless network to the wireless network is provided;

wherein the wireless network node is configured for communicating with the user equipment simultaneously over a first component carrier group comprising one or more primary component carriers and over a second component carrier group comprising one or more secondary component carriers;

wherein the wireless network node is configured for communicating with the user equipment using different operational modes;

wherein the wireless network node is configured for exchanging portions of signalling data over each of the primary component carriers and portions of user data over each of the primary component carriers and over each of the secondary component carriers with the user equipment;

the method comprising the steps:

operating the wireless network node in a first operational mode of the operational modes in a first operational phase, wherein in the first operational mode the portions of the signalling data are exclusively exchanged over the primary component carriers;

operating the wireless network node in a second operational mode of the operational modes in a second operational phase subsequent to the first operational phase, wherein in the second operational mode the portion of the signalling data of a selected primary component carrier of the primary component carriers of the first component carrier group is simultaneously exchanged over the selected primary component carrier and over a selected secondary component carrier of the secondary component carriers of the second component carrier group, wherein the second operational phase is initiated in case that a first trigger condition occurs;

operating the wireless network node in a third operational mode of the operational modes in a third operational phase subsequent to the second operational phase, wherein in the third operational mode the selected secondary component carrier from the second operational phase is used as one of the primary component carriers, so that the selected secondary component carrier from the second operational phase is added to the primary component carriers of the first component carrier group and removed from secondary component carriers of the second component carrier group in the third operational phase, wherein the third operational phase is initiated in case that a second trigger condition occurs.

In a further aspect, a computer program for, when running on a processor, executing the method described herein is provided.

BRIEF DESCRIPTION OF THE DRAWINGS

Embodiments of the invention are subsequently discussed with respect to the accompanying drawings, in which:

FIG. 4 shows, as an example, a flow chart illustrating the coordination between a user equipment according to the invention and a wireless network node according to the invention regarding different operational modes for communication;

FIG. 5 shows, as an example, a further chart illustrating the coordination between a user equipment according to the invention and a wireless network node according to the invention regarding the different operational modes for communication.

DETAILED DESCRIPTION OF THE INVENTION

Figure 1:
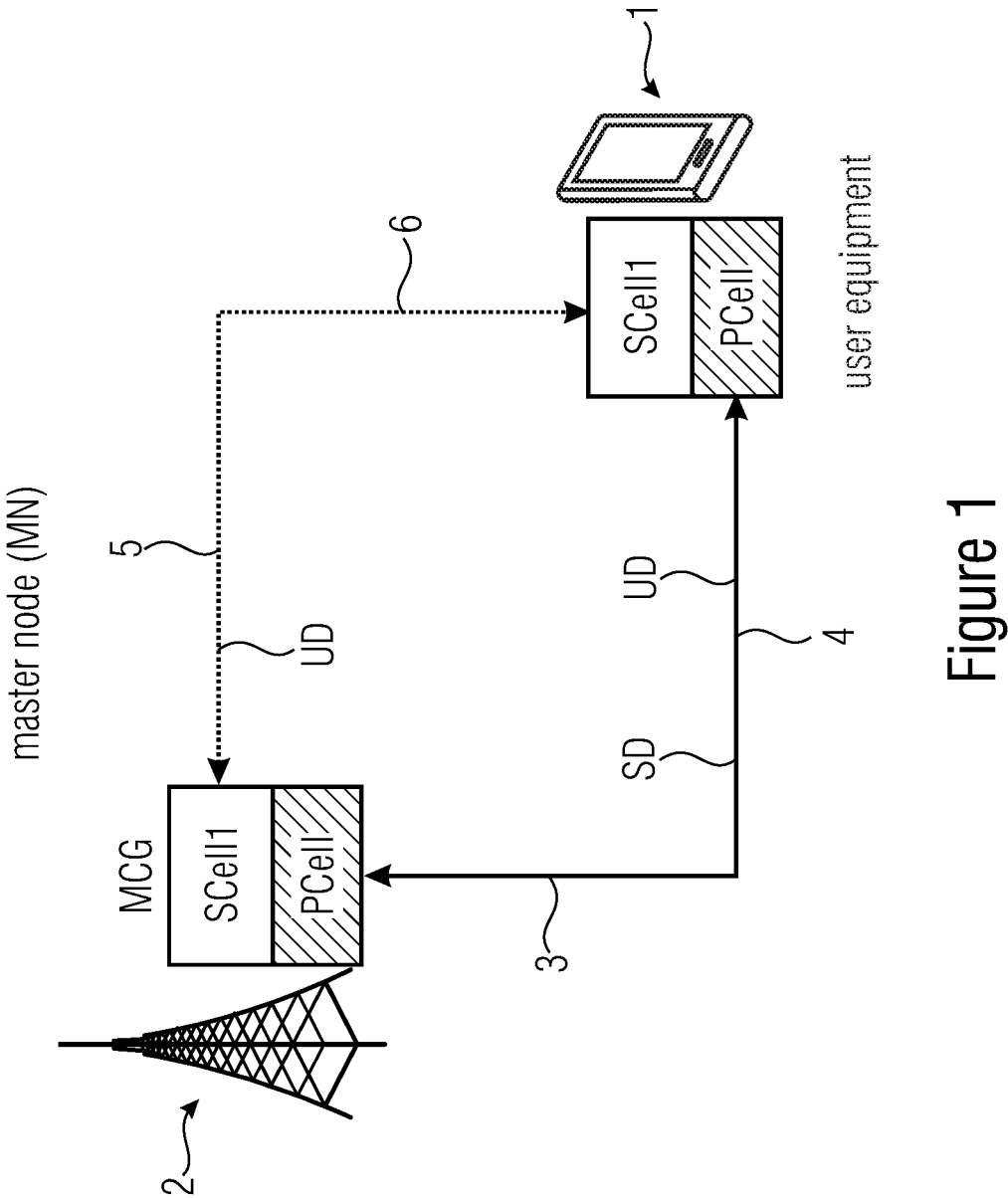
FIG. 1 illustrates, as an example, an embodiment of a user equipment according to the invention, which communicates with a wireless network node according to the invention in a schematic view.

Equal or equivalent elements or elements with equal or equivalent functionality are denoted in the following description by equal or equivalent reference numerals.

In the following description, a plurality of details is set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

FIG. 1 illustrates, as an example, an embodiment of a user equipment 1 according to the invention, which communicates with a wireless network node 2 according to the invention in a schematic view.

Shown in FIG. 1 is a user equipment 1 for communication over a wireless network;

wherein the user equipment 1 is configured for communicating with one or more wireless network nodes 2 of the wireless network simultaneously over a first component carrier group 3 comprising one or more primary component carriers 4 and over a second component carrier group 5 comprising one or more secondary component carriers 6;

wherein the user equipment 1 is configured for exchanging portions of signalling data SD over each of the primary component carriers 4 and portions of user data UD over each of the primary component carriers 4 and over each of the secondary component carriers 6 with the one or more wireless network nodes 2;

wherein the user equipment 1 is configured for communicating with the one or more wireless network nodes 2 of the wireless network using different operational modes FOM, SOM, TOM;

wherein the user equipment 1 is configured for exchanging the portions of the signalling data SD exclusively over the primary component carriers 4 in a first operational mode FOM of the operational modes FOM, SOM, TOM in a first operational phase FOP;

wherein the user equipment 1 is configured for exchanging the portion of the signalling data SD of a selected primary component carrier 7 of the primary component carrier of the first component carrier group 3 simultaneously over the selected primary component carrier 7 and over a selected secondary component carrier 8 of the secondary component carriers 6 of the second component carrier group 5 in a second operational mode SOM of the operational modes FOM, SOM, TOM in a second operational phase SOP subsequent to the first operational phase FOM, wherein the second operational phase SOP is initiated in case that a first trigger condition FTC occurs;

wherein the user equipment 1 is configured for using the selected secondary component carrier 8 from the second operational phase SOP in a third operational mode TOM of the operational modes FOM, SOM, TOM in a third operational phase TOP subsequent to the second operational phase SOP as one of the primary component carriers 4, so that the selected secondary component carrier 8 from the second operational phase SOP is added to the primary component carriers 4 of the first component carrier group 3 and removed from secondary component carriers 6 of the second component carrier group 5 in the third operational phase TOP, wherein the third operational phase TOP is initiated in case that a second trigger condition STC occurs.

According to some embodiments, the user equipment 1 is configured for using the selected primary component carrier 7 from the second operational phase SOP in the third operational mode TOM of the operational modes in the third operational phase TOP as one of the secondary component carriers 6, so that the selected primary component carrier 7 from the second operational phase SOP is added to the secondary component carriers 6 of the second component carrier group 5 and removed from primary component carriers 4 of the first component carrier group 3 in the third operational phase TOP.

FIG. 1 shows a wireless network 2 node for connecting a user equipment 1 for communication over a wireless network to the wireless network;

wherein the wireless network node 2 is configured for communicating with the user equipment 1 simultaneously over a first component carrier group 3 comprising one or more primary component carriers 4 and over a second component carrier group 5 comprising one or more secondary component carriers 6;

wherein the wireless network node 2 is configured for communicating with the user equipment 1 using different operational modes FOM, SOM, TOM;

wherein the wireless network node 2 is configured for exchanging portions of signalling data SD over each of the primary component carriers 4 and portions of user data UD over each of the primary component carriers 6 and over each of the secondary component carriers 6 with the user equipment 1;

wherein the wireless network node 2 is configured for exchanging the portions of the signalling data SD exclusively over the primary component carriers 4 in a first operational mode FOM of the operational modes FOM, SOM, TOM in a first operational phase FOP;

wherein the wireless network node 2 is configured for exchanging the portion of the signalling data SD of a selected primary component carrier 7 of the primary component carriers 4 of the first component carrier group 3 simultaneously over the selected primary component carrier 7 and over a selected secondary component carrier 8 of the secondary component carriers 6 of the second component carrier group 5 in a second operational mode SOM of the operational modes FOM, SOM, TOM in a second operational phase SOP subsequent to the first operational phase FOP, wherein the second operational phase SOP is initiated in case that a first trigger condition FTC occurs;

wherein the wireless network node 2 is configured for using the selected secondary component carrier 8 from the second operational phase SOP in a third operational mode TOM of the operational modes FOM, SOM, TOM in a third operational phase TOP subsequent to the second operational phase SOP as one of the primary component carriers 4, so that the selected secondary component carrier 8 from the second operational phase SOP is added to the primary component carriers 4 of the first component carrier group 3 and removed from secondary component carriers 6 of the second component carrier group 5 in the third operational phase TOP, wherein the third operational phase TOP is initiated in case that a second trigger condition STC occurs.

According to some embodiments, the wireless network node 2 is configured for using the selected primary component carrier 7 from the second operational phase SOP in the third operational mode TOM in the third operational phase TOP as one of the secondary component carriers 6, so that the selected primary component carrier 7 from the second operational phase SOP is added to the secondary component carriers 6 of the second component carrier group 5 and removed from primary component carriers 4 of the first component carrier group 3 in the third operational phase TOP.

In FIG. 1 a user equipment 1 is connected to a single wireless network node 2 over a first component carrier group 3, which in this case only comprises one primary component carrier 4, and over a second component carrier group 5, which in this case only comprises one secondary component carrier 6. All signalling data SD are carried in a first operational mode FOM in a first operational phase FOP by the first component carrier group 3. User data UD are, in the first operational mode FOM in the first operational phase FOP, carried in part by the first component carrier group 3 and in part by the second component carrier group 5. A second operational mode SOM for a second operational phase SOP and a third operational mode TOM for a third operational phase TOP will be explained with reference to FIGS. 3 to 5.

Figure 2:
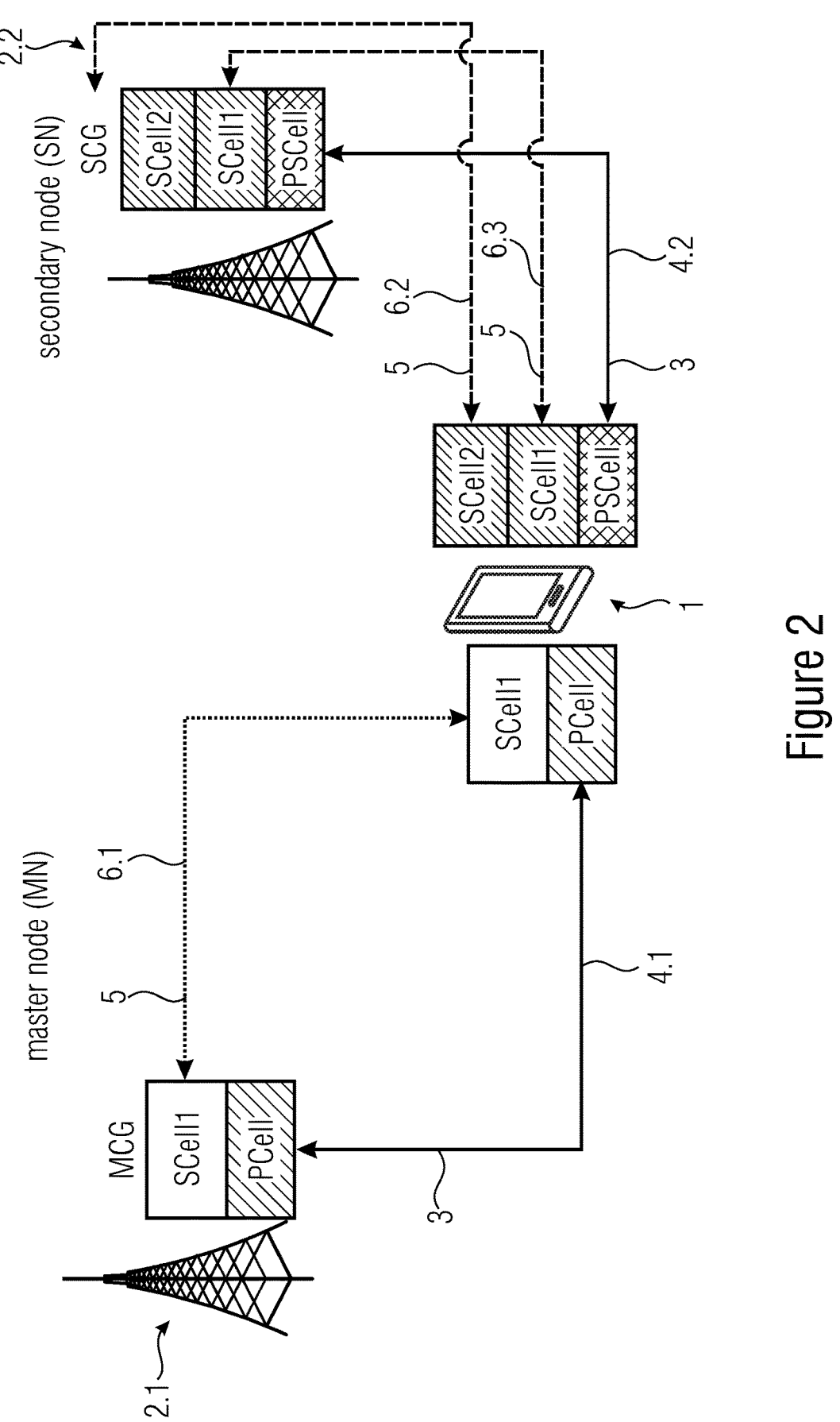
FIG. 2 illustrates, as an example, an embodiment of a user equipment according to the invention, which communicates with two wireless network nodes according to the invention in a schematic view.

FIG. 2 illustrates, as an example, an embodiment of a user equipment 1 according to the invention, which communicates with two wireless network nodes 2.1 and 2.2 according to the invention in a schematic view. In this example, user equipment 1 is connected to the wireless network nodes 2.1 and 2.2 over a first component carrier group 3, which comprises the primary component carriers 4.1 and 4.2, and over a second component carrier group 5, which comprises the secondary component carriers 6.1, 6.2 and 6.3.

As in the example before, signalling data SD are carried in a first operational mode FOM in a first operational phase FOP by the first component carrier group 3. User data UD are, in the first operational mode FOM in the first operational phase FOP, carried in part by the first component carrier group 3 and in part by the second component carrier group 5. A second operational mode SOM for a second operational phase SOP and a third operational mode TOM for a third operational phase TOP will be explained with reference to FIGS. 3 to 5.

Figure 3:
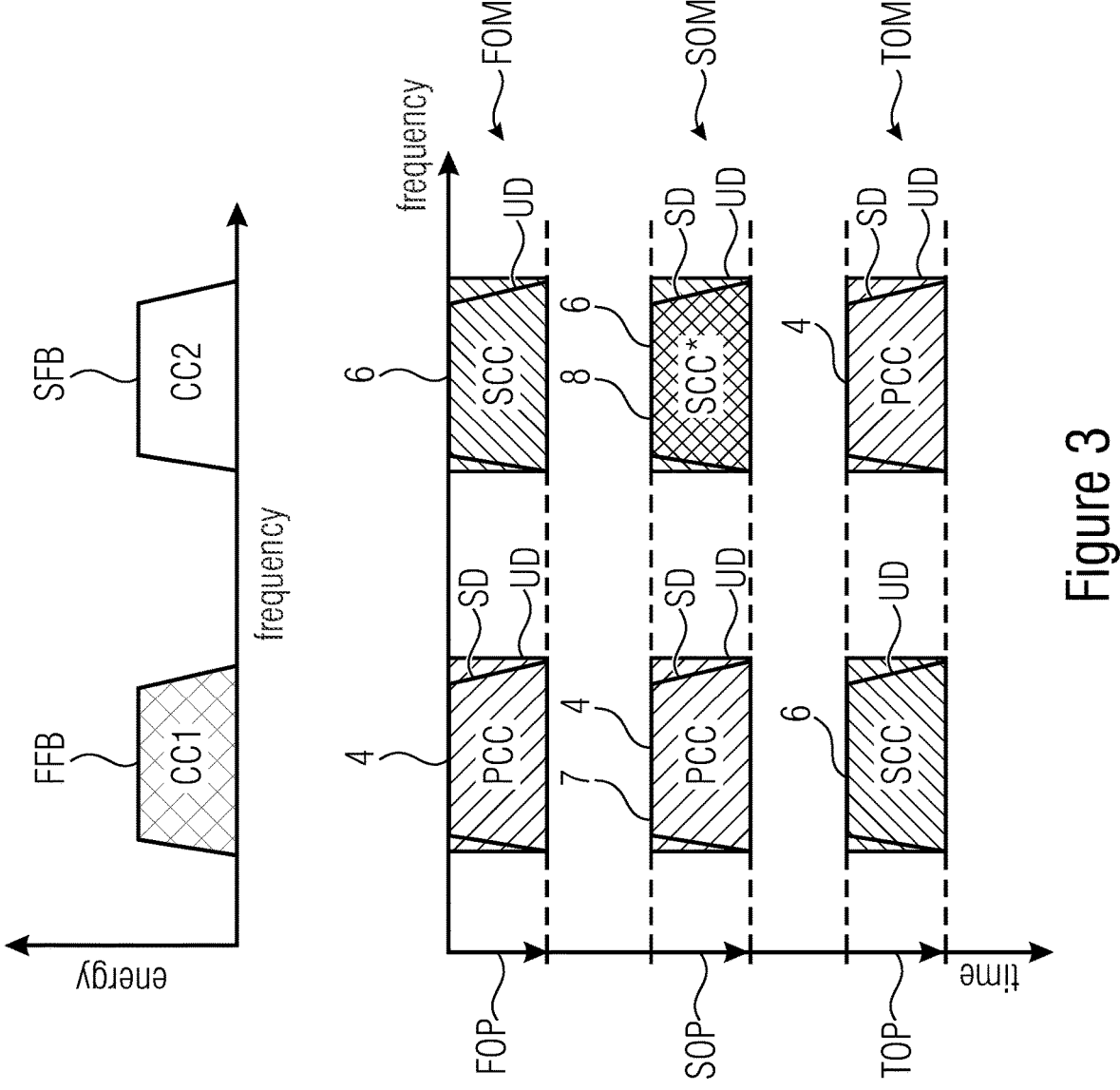
FIG. 3 illustrates, as an example, different operational phases for communication between a user equipment according to the invention and a wireless network node according to the invention in a schematic view.

FIG. 3 illustrates, as an example, different operational phases FOP, SOP, TOP for communication between a user equipment 1 according to the invention and a wireless network node 2 according to the invention in a schematic view.

FIG. 3 illustrates a method for operating a user equipment 1 for communication over a wireless network;

wherein the user equipment 1 is configured for communicating with one or more wireless network nodes 2 of the wireless network simultaneously over a first component carrier group 3 comprising one or more primary component carriers 4 and over a second component carrier group 5 comprising one or more secondary component carriers 6;

wherein the user equipment 1 is configured for communicating with the one or more wireless network nodes 2 of the wireless network using different operational modes FOM, SOM, TOM;

wherein the user equipment 1 is configured for exchanging portions of signalling data SD over each of the primary component carriers 4 and portions of user data UD over each of the primary component carriers 4 and over each of the secondary component carriers 6 with the one or more wireless network nodes 2;

the method comprising the steps:

operating the user equipment 1 in a first operational mode FOM of the operational modes FOM, SOM, TOM in a first operational phase FOP, wherein in the first operational mode FOM the portions of the signalling data SD are exclusively exchanged over the primary component carriers 4;

operating the user equipment 1 in a second operational mode SOM of the operational modes FOM, SOM, TOM in a second operational phase SOP subsequent to the first operational phase FOP, wherein in the second operational mode SOM the portion of the signalling data SD of a selected primary component carrier 7 of the primary component carriers 4 of the first component carrier group 3 is simultaneously exchanged over the selected primary component carrier 7 and over a selected secondary component carrier 8 of the secondary component carriers 6 of the second component carrier group 5, wherein the second operational phase SOP is initiated in case that a first trigger condition FTC occurs;

operating the user equipment in a third operational mode FOM of the operational modes FOM, SOM, TOM in a third operational phase TOP subsequent to the second operational phase SOP, wherein in the third operational mode TOM the selected secondary component carrier 8 from the second operational phase SOP is used as one of the primary component carriers 4, so that the selected secondary component carrier 8 from the second operational phase SOP is added to the primary component carriers 4 of the first component carrier group 3 and removed from secondary component carriers 6 of the second component carrier group 5 in the third operational phase TOP, wherein the third operational phase TOP is initiated in case that a second trigger condition STC occurs.

FIG. 3 illustrates a computer program for, when running on a processor, executing the method described herein.

FIG. 3 illustrates a method for operating a wireless network node 2 for connecting a user equipment 1 for communication over a wireless network to the wireless network;

wherein the wireless network node 2 is configured for communicating with the user equipment 1 simultaneously over a first component carrier group 3 comprising one or more primary component carriers 4 and over a second component carrier group 5 comprising one or more secondary component carriers 6;

wherein the wireless network node 2 is configured for communicating with the user equipment 1 using different operational modes FOM, SOM, TOM;

wherein the wireless network node 2 is configured for exchanging portions of signalling data SD over each of the primary component carriers 4 and portions of user data UD over each of the primary component carriers 4 and over each of the secondary component carriers 6 with the user equipment 1;

the method comprising the steps:

operating the wireless network node 2 in a first operational mode FOM of the operational modes FOM, SOM, TOM in a first operational phase FOP, wherein in the first operational mode FOM the portions of the signalling data SD are exclusively exchanged over the primary component carriers 4;

operating the wireless network node 2 in a second operational mode SOM of the operational modes FOM, SOM, TOM in a second operational phase SOP subsequent to the first operational phase FOP, wherein in the second operational mode SOM the portion of the signalling data SD of a selected primary component carrier 7 of the primary component carriers 4 of the first component carrier group 3 is simultaneously exchanged over the selected primary component carrier 7 and over a selected secondary component carrier 8 of the secondary component carriers 6 of the second component carrier group 5, wherein the second operational phase SOP is initiated in case that a first trigger condition FTC occurs;

operating the wireless network node 2 in a third operational mode TOM of the operational modes FOM, SOM, TOM in a third operational phase TOP subsequent to the second operational phase SOP, wherein in the third operational mode TOM the selected secondary component carrier 8 from the second operational phase SOP is used as one of the primary component carriers 4, so that the selected secondary component carrier 8 from the second operational phase SOP is added to the primary component carriers 4 of the first component carrier group 3 and removed from secondary component carriers 6 of the second component carrier group 5 in the third operational phase TOP, wherein the third operational phase TOP is initiated in case that a second trigger condition STC occurs.

FIG. 3 illustrates a computer program for, when running on a processor, executing the method according to the preceding claim.

An example of signalling data SD and user data UD allocation is shown in FIG. 3, wherein a first frequency band FFB and a second frequency band SFB are used. Although the usage of the first frequency band FFB and of the second frequency band SFB is changed, the frequency definitions of the first frequency band FFB and of the second frequency band SFB are not.

With reference to the example shown, in a first operational mode FOM in a first operational phase FOP first frequency band FFB is used as the primary component carrier 4 carrying both signalling data SD and user data UD and the second frequency band SFB is used as secondary component carrier 6 carrying user data UD only. This state, thus, represents what could be called normal operation.

In two further operational phases SOP, TOP, the signalling data SD will be transferred from the first frequency band FFB to the second frequency band SFB without interruption to the transfer of signalling data SD.

In the second operational mode SOM in the second operational phase SOP, which could be called the intermediate phase, the signalling data SD are additionally carried by the second frequency band SFB. This ensures that the flow of both signalling data SD and user data UD is not interrupted since frequency bands FFB, SFB are effectively carrying the same data. However, it has to be noted, that the second frequency band SFB is still used as secondary component carrier 6 so that solely the signalling data SD carried by the primary component carrier 4 at the first frequency band FFB are used for coordinating the connection between the user equipment 1 and the wireless network node 2.

In the third operational phase TOP, the transition to the third operational mode TOM is completed: The first frequency band FFB is used for user data UD only and is, thus, used as secondary component carrier 4; and the second frequency band SFB is used for both signalling data SD and user data UD and is, thus, used as the primary component carrier 4.

In order to enable the swapping between primary component carriers 4 and secondary component carriers 6, a number of steps may be performed:

The user equipment 1 needs to be provided by a first trigger condition FTC that will initiate a transition from the first operational phase FOP to the second operational phase SOP and a second trigger condition STC that will initiate a transition from the second operational phase SOP to the third operational phase TOP. The trigger conditions FTC, STC need to be defined in a way not to cause frequent change between the first operational phase FOP and the subsequent operational phases SOP, TOP as small-scale as well as large-scale variations are an inherent part of the wireless links. In that respect, first, second or even higher-order statistics on channel quality can be used. Channel quality information can be obtained from a wide range of reports, for example channel status information reports (CSI-R), can be configured, wherein the user equipment 1 may report the channel quality in the time, frequency, and spatial domains on all active downlink component carriers. On the uplink, the wireless network node 2 may determine the channel quality based on the sounding reference signal (SRS).

If/when the first trigger condition FTC is met on the selected secondary component carrier 8, all physical layer data (PHY), medium access layer data (MAC), RLC and packet data convergence protocol data (PDCP) resources need to be configured. For example, if the physical downlink data channels (PDCCH) and physical uplink channels (PUCCH) resources are not available, they need to be configured. In relation to physical downlink data channels (PDCCH) resources/monitoring, if the only suitable secondary component carrier is cross-scheduled, complete configuration of the physical downlink data channels (PDCCH) resources on the selected secondary component carrier 8 is required. This includes configuration of common and user equipment specific search spaces and allocation of appropriate radio network temporary identities—for example, new system information radio network temporary identities (SI-RNTI), new paging radio network temporary identities (P-RNTI) and optionally new Cell radio network temporary identities (C-RNTI). These can be passed in the dedicated signalling and should be kept as a part of the new configuration in case of swapping between primary component carrier 4 and secondary component carrier 6 later.

Selected secondary component carrier should have radio link monitoring (RLM) activated. Radio link monitoring (RLM) will enable monitoring of the downlink link quality based on the reference signal in the configured resources in order to detect the downlink radio link quality of the secondary component carrier. The configured resources can be initially channel status reference signals (CSI-RS) only on the active downlink bandwidth part. On each monitored resource, the user equipment 1 may estimate the downlink radio link quality and compare it to the configured thresholds Qout and Qin. The threshold Qout is defined as the level at which the downlink radio link cannot be reliably received and corresponds to the out-of-sync block error rate (BLERout) (defined in Table 6.5.1-1. [32]). The threshold Qin is defined as the level at which the downlink radio link quality can be significantly more reliably received than at Qout and corresponds to the in-sync block error rate (BLERin) as defined in Table 6.5.1-1. The out-of-sync block error rate (BLERout) and in-sync block error rate (BLERin) are determined from the network configuration signalled by higher layers.

To enable appropriate scheduling and distribution across different carriers, establishment of new radio link control entities and logical channel grouping can be performed similarly as in the case in carrier aggregation duplication. In the downlink, the prioritisation and distribution of signalling data can be performed by the scheduler, similarly as in carrier aggregation duplication or using some other method. In the uplink, the existing, well-defined rules for priority handling in the user equipment 1 can be used. Priority handling in the device determines which logical channels are eligible for multiplexing using the received scheduling grant, including the set of uplink component carriers the logical channel is allowed to be transmitted upon and the fraction of resources.

Once the above steps are performed, the new configuration is applied and newly-defined distributed-radio link control timer is started. Signalling data SD are then transmitted-received on both component carriers 7, 8. During the transient state, at the receiver, a higher layer, e.g. radio link control (RLC) or packet data convergence protocol data (PDCP) layer can be configured to remove duplicates in case of duplication and when the data is successfully received on both carriers.

If the second trigger condition STC occurs, the new configuration is applied in a third operational phase TOP and, for example, the primary component carrier 4 from the first operational phase FOP is used as the secondary component carrier 6 and the secondary component carrier 6 from the first operational phase FOP is used as the primary component carrier 4.

It should be noted that the activation of radio link monitoring (RLM) on the secondary component carrier 6 may be done during the third operational phase TOP in order to avoid extra power consumption created by the activation of radio link monitoring (RLM) on both carriers for the entire duration of the timer. In either case, signalling data SD are now delivered using the new primary component carrier 4 on the second frequency band SFB and the procedure can be deactivated. Otherwise, the old configuration applies and signalling data SD are delivered in a fourth operational phase FOOP using the primary component carrier 4 from the first operational phase FOP of the first frequency band FFB.

Note: The above described procedure does not describe the change of the security keys nor the random access procedure for synchronisation to secondary component carrier. For example, radio link control data (RRC) reconfiguration with synch may be performed, depending on, for example, the additional/delta configuration requirements between the primary component carrier 4 and the new primary component carrier 4. Radio link control data (RRC) reconfiguration procedure with sync entails random access procedure to the new primary component carrier 4.

FIG. 4 shows, as an example, a flow chart illustrating the coordination between a user equipment 1 according to the invention and a wireless network node 2 according to the invention regarding different operational modes FOM, SOM, TOM for communication.

According to some embodiments, the user equipment 1 is configured for transmitting a capability information CAI to one of the wireless network nodes 2 in the first operational phase FOP over one of the primary component carriers 4, wherein the capability information CAI indicates that the user equipment 1 is capable of operating in the second operational mode SOM and in the third operational mode TOM.

According to some embodiments, the user equipment 1 is configured for receiving a trigger information TIN from one of the wireless network nodes 2 in the first operational phase FOP over one of the primary component carriers 4, wherein the trigger information TIN indicates the first trigger condition FTC and/or the second trigger condition STC.

According to some embodiments, the user equipment 1 is configured for transmitting a trigger confirmation information TCI to one of the wireless network nodes 2 in the first operational phase FOP over one of the primary component carriers 4, wherein the trigger confirmation information TCI indicates that the trigger information TIN has been received by the user equipment 1.

According to some embodiments, the user equipment 1 is configured for receiving a selection information SIN from one of the wireless network nodes 2 in the first operational phase FOP over one of the primary component carriers 4, wherein the selection information SIN indicates which of the secondary component carriers 6 of the second component carrier group 5 is the selected secondary component carrier 8 for the second operational mode SOM or wherein the selection information SIN indicates conditions for selecting the selected secondary component carrier 8 for the second operational mode SOM.

The selection information SIN indicates the selection condition(s) the user equipment 1 uses as an input in selecting the secondary component carriers 6 of the second component carrier group 5 for the second operational mode SOM.

According to some embodiments, the user equipment 1 is configured for transmitting a selection confirmation information SCI to one of the wireless network nodes 2 in the first operational phase FOP over one of the primary component carriers 4, wherein the selection confirmation information SCI indicates that the selection information SIN has been received by the user equipment 1.

According to some embodiments, the user equipment 1 is configured for receiving a configuration information CIN from one of the wireless network nodes 2 in the first operational phase FOP over one of the primary component carriers 4, wherein the configuration information CIN indicates a configuration of the selected secondary component carrier 8 for the second operational mode SOM.

The configuration information CIN indicates the required configuration information for the selected secondary component carrier 8 and/or for all the secondary component carriers 6 of the second component carrier group 5 for the second operational mode SOM.

According to some embodiments, the user equipment 1 is configured for transmitting a configuration confirmation information CCI to one of the wireless network nodes 2 in the first operational phase FOP over one of the primary component carriers 4, wherein the configuration confirmation information CCI indicates that the configuration information CIN has been received by the user equipment 1.

According to some embodiments, the user equipment 1 is configured for detecting an occurrence of the first trigger condition FTC in the first operational phase FOP and, in case that the occurrence of the first trigger condition FTC is detected, for initiating the second operational phase SOP by switching to the second operational mode SOM and by transmitting a first switching information FSI to one of the wireless network nodes 2 over one of the primary component carriers 4, wherein the first switching information FSI indicates that the user equipment 1 is in the second operational mode SOM.

According to some embodiments, the user equipment 1 is configured for detecting an occurrence of the second trigger condition STC in the second operational phase SOP at an end ETIV of a time interval starting at a beginning BSOP of the second operational phase SOP.

According to some embodiments, the user equipment 1 is configured, in case that the occurrence of the second trigger condition STC is detected at the end ETIV of the time interval, for initiating the third operation phase TOP by switching to the third operational mode TOM and by transmitting a second switching information SSI to one of the wireless network nodes 2 over one of the primary component carriers 4, wherein the second switching information SSI indicates that the user equipment 1 is in the third operational mode TOM.

According to some embodiments, the user equipment 1 is configured, in case that the occurrence of the second trigger condition STC is not detected at the end ETIV of the time interval, for initiating a fourth operational phase FOOP subsequent to the second operational phase SOP by switching to the first operational mode FOM and by transmitting a third switching information TSI to one of the wireless network nodes 2 over one of the primary component carriers 4, wherein the third switching information TSI indicates that the user equipment 1 is in the first operational mode FOM.

According to some embodiments, the wireless network node 2 is configured for receiving a capability information CAI from the user equipment 1 in the first operational phase FOP over one of the primary component carriers 4, wherein the capability information CAI indicates that the user equipment 1 is capable of operating in the second operational mode SOM and in the third operational mode TOM.

According to some embodiments, the wireless network node 2 is configured for transmitting a trigger information TIN to the user equipment 1 in the first operational phase FOP over one of the primary component carriers 4, wherein the trigger information TIN indicates the first trigger condition FTC and/or the second trigger condition STC.

According to some embodiments, the wireless network node 2 is configured for receiving a trigger confirmation information TCI from the user equipment 1 in the first operational phase FOP over one of the primary component carriers 4, wherein the trigger confirmation information TCI indicates that the trigger information TIN has been received by the user equipment 1.

According to some embodiments, the wireless network node 2 is configured for transmitting a selection information SIN to the user equipment 1 in the first operational phase FOP over one of the primary component carriers 4, wherein the selection information SIN indicates which of the secondary component carriers 6 of the second component carrier group 5 is the selected secondary component carrier 8 for the second operational mode SOM or wherein the selection information SIN indicates conditions for selecting the selected secondary component carrier 8 for the second operational mode SOM.

The selection information SIN indicates the selection condition(s) the user equipment 1 uses as an input in selecting the secondary component carriers 6 of the second component carrier group 5 for the second operational mode SOM.

According to some embodiments, the wireless network node 2 is configured for receiving a selection confirmation information SCI from the user equipment 1 in the first operational phase FOP over one of the primary component carriers 4, wherein the selection confirmation information SCI indicates that the selection information SIN has been received by the user equipment 1.

According to some embodiments, the wireless network node 2 is configured for transmitting a configuration information CIN to the user equipment 1 in the first operational phase FOP over one of the primary component carriers 4, wherein the configuration information CIN indicates a configuration of the selected secondary component carrier 8 for the second operational mode SOM.

The configuration information CIN indicates the required configuration information for the selected secondary component carrier 8 and/or for all the secondary component carriers 6 of the second component carrier group 5 for the second operational mode SOM.

According to some embodiments, the wireless network node 2 is configured for receiving a configuration confirmation information CCI from the user equipment 1 in the first operational phase FOP over one of the primary component carriers 4, wherein the selection confirmation information SCI indicates that the configuration information CIN has been received by the user equipment 1.

According to some embodiments, the wireless network node 2 is configured for switching to the second operational mode SOM after receiving a first switching information FSI from the user equipment 1 over one of the primary component carriers 4, wherein the first switching information FSI indicates that the user equipment 1 is in the second operational mode SOM.

According to some embodiments, the wireless network node 2 is configured for switching to the third operational mode TOM after receiving a second switching information SSI from the user equipment 1 over one of the primary component carriers 4, wherein the second switching information SSI indicates that the user equipment 1 is in the third operational mode TOM.

According to some embodiments the wireless network node 2 is configured for switching to the first operational mode FOM in a fourth operational phase FOOP subsequent to the second operational phase SOP after receiving a third switching information TSI from the user equipment 1 over one of the primary component carriers 4, wherein the third switching information TSI indicates that the user equipment 1 is in the first operational mode FOM.

FIG. 5 shows, as an example, a further chart illustrating the coordination between a user equipment 1 according to the invention and a wireless network node 2 according to the invention regarding the different operational modes FOM, SOM, TOM for communication.

To illustrate the proposed mechanism, a basic example with two component carriers is shown in FIGS. 4 and 5. The example refers to 5G NR technology. However, similar embodiments are possible in other radio access technologies, such as 4G LTE or WIFI.

At start, a user equipment 1 is connected to a wireless network node 2, which in the example is a 5G-base station, on a primary component carrier 4. The user equipment 1 is in a connected to the wireless network node 2 with all associated signalling data SD operated via the primary component carrier 4. Signalling data SD here may include physical layer data (PHY), medium access layer data (MAC), packet data convergence protocol data (PDCP) and radio link control data (RRC). At this point, the user equipment 1 may send a carrier aggregation capability information ACI to the wireless network node 2 to indicate that it supports carrier aggregation.

Now the user equipment 1 may receive a carrier aggregation activation information AAI from the wireless network node 2, so that carrier aggregation is activated by activating one or more secondary (additional) component carriers 6 by using signalling data SD (medium access layer data control element (MAC-CE)). This will start the first operational phase FOP using the first operational mode FOM and will increase the total bandwidth/data rate for the user data UD. Signalling data SD that handle the connection between the user equipment 1 and the wireless network node 2, for example management of the signalling and data radio bearers, security handling and other functions performed by radio link control data (RRC) are routed/operated via the primary component carrier 4.

Furthermore, radio link monitoring may be only activated the primary component carrier 4. It should be noted that in this case, the quality of the link on the secondary component carrier 6 may be known to the wireless network node 2 through channel state information (CSI) reported by the user equipment 1 and through measurements of the user equipment's 1 sounding reference signal (SRS).

The user equipment 1 may monitor physical downlink data channels (PDCCH) of the primary component carrier 4 for downlink scheduling assignments, uplink scheduling grants, power control etc. Physical downlink data channels may also be monitored on the secondary component carriers 6 unless cross-carrier scheduling is defined for a specific secondary component carrier 6, in which case the physical downlink data channels of the scheduled secondary component carrier 6 is monitored on the primary component carrier 4. On the uplink, the user equipment 1 may use physical uplink control channels (PUCCH) on the primary component carrier 4 for reception acknowledgements, scheduling request and channel state information for all carriers. In a case, where we consider only two carriers, physical uplink control channel transmissions may be entailed only on the primary component carrier 4.

Furthermore, the user equipment 1 may send a capability information CAI to the wireless network node 2 to indicate that it supports the second operational mode SOM and the third operational mode TOM.

Now the wireless network node 2 may preconfigure the user equipment 1 with a trigger information TIN comprising a first trigger condition FTC and/or a second trigger condition STC and a selection information SIN describing which of the secondary component carriers 6 is selected secondary component carrier 8 and the required configuration information CIN. In case that a plurality of primary component carriers 4 are active, the selection information SIN ma also describe which of the primary component carriers 4 is selected primary component carrier 7. For example, the first or second trigger condition FTC, STC could be configured as x number of instances where a timer, in particular a radio link failure timer has started, but has not expired within y sec. In case of a beam-based operation, the trigger conditions FTC, STC could be based on a number of beam failures that that would lead the user equipment 1 to declare a radio link failure. A further trigger condition FTC, STC could also be that the selected secondary component carrier 8 becomes offset better than the selected primary component carrier 7 or that the selected primary component carrier 7 becomes worse than a first threshold and the selected secondary component carrier 8 becomes better than a second threshold. The trigger conditions FTC, STC can be signalled to the user equipment 1 using a radio resource control reconfiguration message as depicted in FIG. 5. The radio resource control reconfiguration command also may carry all the required configuration information (CIN) for physical layer data—physical downlink data channels and physical uplink channels, as well as medium access layer data and radio link control data. The user equipment 1 acknowledges the receipt of the new configuration using a trigger confirmation information TCI such as RRC_Reconfiguration_CPCAD_Acknowledgment.

The procedure may then be activated by the wireless network node 2, using, for example, a newly defined medium access layer data control element information. At this point, the user equipment 1 monitors the quality of the secondary component carriers 6 and reports them back, for example, using channel status information (CSI) and any additional specified reports. Given that the user equipment 1 may be connected to a number of secondary component carriers 6, additional monitoring and performance comparison may be performed between the carriers in order to determine the most suitable selected secondary component carrier 8. The statistics on channel quality, preferences in terms of the enabled physical downlink data channels monitoring on a secondary component carrier 6 (i.e. a secondary component carriers 6 that is not scheduled on a different carrier), physical uplink channels resources on a secondary component carrier 6 or on a timing advance group, to which the secondary component carriers 6 belongs to (in case of a user equipment 1 having multiple timing advance capability), may be taken into account.

Once the first trigger condition FTC is met, the user equipment 1 may apply the new configuration NCO (physical layer data, medium access layer data and radio link control resources, including a secondary radio link control entity, if applicable). Once the new configuration NCO is applied, the user equipment 1 informs the wireless network node 2 using a first switching information FSI. User equipment 1 also starts the new radio link control distribution timer so that the second operational phase SOP using the second operational mode SOM may be initiated.

During the second operational phase SOP in the second operational mode, both selected primary component carrier 7 and the selected secondary component carrier 8 are able to carry signalling data SD, for example radio resource control related information and measurement reports, between the user equipment 1 and the wireless network node 2. However, at this point the signalling data SD carried by the selected primary component carrier 7 but not the signalling data carried by the selected secondary component carrier 8 are used for coordinating the connection between the user equipment 1 and the wireless network node 2.

If the timer expires at the end ETIV of the time interval and if the second trigger condition STC is still met, the user equipment 1 activates the signalling data SD on the selected secondary component carrier 8, so that the selected secondary component carrier 8 is removed from the second component carrier group 5 and added to the first component carrier group 3, thus, becoming a new primary component carrier 4 in the third operational mode during the third operational phase TOP.

A second switching information SSI may be sent by the user equipment 1 on the new primary component carrier 4, so that the wireless network node 2 may also switch to the third operational mode TOM during the third operational phase TOP.

In this case, the user equipment further may receive reconfiguration information RCI from the wireless network node 2, which contains additional or delta or any applicable configuration, based on the latest measurement report, and may execute a reconfiguration procedure RCP.

If the timer expires at the end ETIV of the time interval and if the second trigger condition STC is not met anymore, the user equipment 1 further returns for the fourth operational phase FOOP to the first operational mode FOM.

A third switching information TSI may be sent by the user equipment 1 on the old primary component carrier 4, so that the wireless network node 2 may also switch to the first operational mode FOM during the fourth operational phase TOOP.

In this case, the user equipment further may receive the original reconfiguration information ORI from the wireless network node 2 and execute a reconfiguration procedure RCP.

After the third operational mode TOM or the first operational mode FOM has been established, a deactivation information DEI, for example a medium access layer data control element, may be sent by the wireless network node 2 to the user equipment 1 in order to deactivate the procedure.

Figure 6:
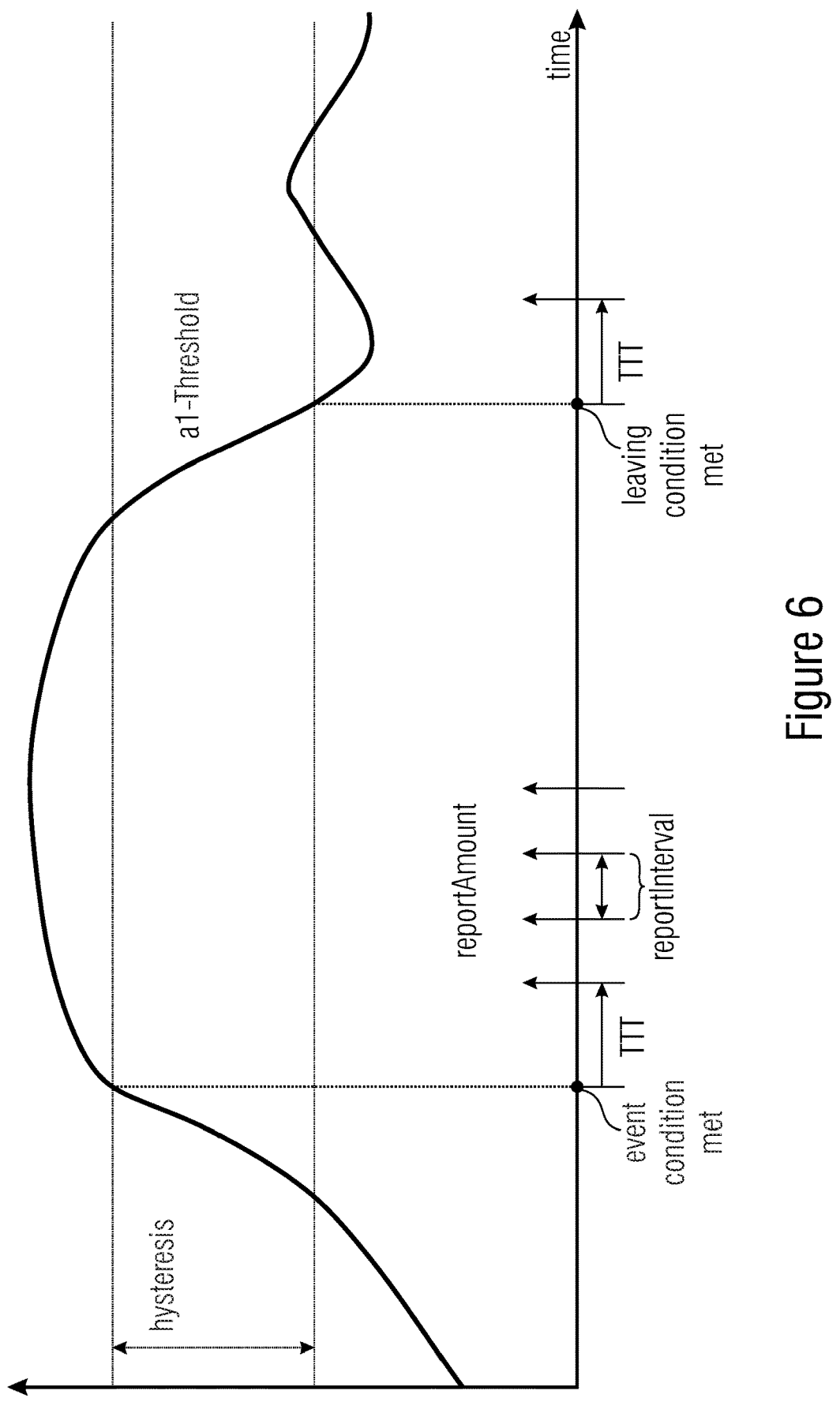
FIG. 6 illustrates, as an example, a method for selecting the one or more primary component carrier for the third operational mode for the communication between a user equipment according to the invention and a wireless network node according to the invention in a schematic view.

FIG. 6 illustrates, as an example, a method for selecting the one or more primary component carrier 4 for the third operational mode TOM for the communication between a user equipment 1 according to the invention and a wireless network node 2 according to the invention in a schematic view.

According to some embodiments of the user equipment 1, the first trigger condition FTC and/or the second trigger condition STC relate to a physical quality of at least some of the primary component carriers 4 and/or to a physical quality of at least some of the secondary component carriers 6.

According to some embodiments of the wireless network node 2, the first trigger condition FTC and/or the second trigger condition STC relate to a physical quality of at least some of the primary component carriers 4 and/or to a physical quality of at least some of the secondary component carriers 6.

In order to select the primary component carrier(s) 4 on which the signalling data SD are exchanged in the third operational mode TOM, several Layer 1 (Physical Layer) measurements may be necessary. The component carriers 4, 6 available in the first operational mode FOM or second operational mode SOM may then be rated according to several metrics. In that respect, any adopted statistical measure on channel quality metrics can be used. A simple, instantaneous metric could be the signal-to-interference-and-noise-ratio (SINR), the reference signal received power (RSRP) or the reference signal received quality (RSRQ). Component carriers 4, 6 with a higher signal-to-interference-and-noise-ratio, reference signal received power or reference signal received quality should be favoured for the exchange of signalling data SD. The angular spread of the available component carriers 4, 6 could also be taken into account. In order to enhance resilience against total loss of signalling data connection due to environmental effects like fading or unintentional or intentional interference (neighbouring cells, jamming), component carriers 4, 6 with a large angular distance should be used. Likewise, as small-scale fading usually affect component carriers 4, 6 close in frequency in a similar way, component carriers 4, 6 with a large spread in frequency should be combined.

Besides instantaneous measurements, the temporal development of several metrics could also be taken into account for the selection of the primary component carriers 4 for the third mode of operation. If, for example, one component carrier 4, 6 during the first operational mode FOM repeatedly fades between a very good and very bad RSRQ, it should not be used as the primary component carrier 4 in the third mode of operation TOM, even if it has a better reference signal received quality at times than another component carrier 4, 6. Such component carriers 4, 6 should be blacklisted for signalling data SD. Similarly, a component carrier 4, 6 that shows persistent good metrics during the first operational mode FOM with periodic brief degradations could be whitelisted, even though the metrics indicate a leave condition briefly.

The measurement results could be filtered using a weighted or moving average or any other statistical method.

The physical layer has to regularly compile and update a list of possible component carriers 4, 6 (periodic reporting) and expose it, together with the quality metrics, to the upper layers, most importantly to the medium-access control layer for the selection of primary component carrier(s) 4. The measurements could also be triggered by higher layers (triggered reporting).

The component carriers 4, 6 may be classified based on metric(s).

The metrics may be measured/reported.

The metrics may be provided/requested.

The metrics may be fixed/dynamic/updated/corrected.

In order to prevent rapid, periodic reconfiguration of the primary component carrier(s) 4, selection of the primary component carriers 4 should be based on a hysteresis of the metrics. The threshold for choosing a component carrier 4, 6 to be included in the primary component carrier list ("Event condition" in FIG. 6) should be a bit higher than the threshold for not using it anymore ("leaving condition" in FIG. 6).

Depending on certain implementation requirements, embodiments of the inventive device and system can be implemented in hardware and/or in software. The implementation can be performed using a digital storage medium, for example a floppy disk, a DVD, a Blu-ray Disc, a CD, a ROM, a PROM, an EPROM, an EEPROM or a FLASH memory, having electronically readable control signals stored thereon, which cooperate (or are capable of cooperating) with a programmable computer system such that one or more or all of the functionalities of the inventive device or system is performed.

In some embodiments, a programmable logic device (for example a field programmable gate array) may be used to perform one or more or all of the functionalities of the devices and systems described herein. In some embodiments, a field programmable gate array may cooperate with a microprocessor in order to perform one or more or all of the functionalities of the devices and systems described herein.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the inventive method can be implemented using an apparatus comprising hardware and/or software. The implementation can be performed using a digital storage medium, for example a floppy disk, a DVD, a Blu-ray Disc, a CD, a ROM, a PROM, an EPROM, an EEPROM or a FLASH memory, having electronically readable control signals stored thereon, which cooperate (or are capable of cooperating) with a programmable computer system such that the respective method is performed.

Depending on certain implementation requirements, embodiments of the inventive method can be implemented using an apparatus comprising hardware and/or software.

Some or all of the method steps may be executed by (or using) a hardware apparatus, like a microprocessor, a programmable computer or an electronic circuit. Some one or more of the most important method steps may be executed by such an apparatus.

Some embodiments according to the invention comprise a data carrier having electronically readable control signals, which are capable of cooperating with a programmable computer system such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, which is stored on a machine readable carrier or a non-transitory storage medium.

A further embodiment comprises a processing means, for example a computer, or a programmable logic device, in particular a processor comprising hardware, configured or adapted to perform one of the methods described herein.

A further embodiment comprises a computer having installed thereon the computer program for performing one of the methods described herein.

Generally, the methods are advantageously performed by any apparatus comprising hardware and or software.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] "TS 38.300 v15.0 NR and NG-RAN Overall Description," 3GPP, 2018.

[2] "TS 38.213 v15.0 Physical layer procedures for control," 3GPP, 2017.

[3] "TS 38.321 v15 Medium Access Control (MAC) protocol specification," 3GPP, 2017.

28

[4] E. Dahlman, S. Parkvall and J. Skold, LTE Radio Access: An Overview, "4G: LTE/LTE-Advanced for Mobile Broadband (1st. ed.)," Academic Press, Inc., USA, 2011.

[5] E. Dahlman, S. Parkvall and J. Skold, Radio-Interface Architecture, "4G: LTE/LTE-Advanced for Mobile Broadband (1st. ed.)," Academic Press, Inc., USA, 2011.

[6] E. Dahlman, S. Parkvall and J. Skold, Physical Transmission Resources, "4G: LTE/LTE-Advanced for Mobile Broadband (1st. ed.)", Academic Press, Inc., USA, 2011.

[7] E. Dahlman, S. Parkvall and J. Skold, Spectrum and RF Characteristics, "4G: LTE/LTE-Advanced for Mobile Broadband (1st. ed.)", Academic Press, Inc., USA, 2011.

[8] "TS 38.300 v16 NR and NG-RAN Overall Description," 3GPP, 2020.

[9] E. Dahlman, S. Parkvall and J. Skold, Spectrum for 5G, "5G NR: The Next Generation Wireless Access Technology (1st. ed.)", Academic Press, Inc., USA, 2018.

[10] E. Dahlman, S. Parkvall and J. Skold, Radio-Interface Architecture, "5G NR: The Next Generation Wireless Access Technology (1st. ed.)", Academic Press, Inc., USA, 2018.

[11] E. Dahlman, S. Parkvall and J. Skold, Overall Transmission Structure, "5G NR: The Next Generation Wireless Access Technology (1st. ed.)", Academic Press, Inc., USA, 2018.

[12] E. Dahlman, S. Parkvall and J. Skold, Channel Sounding, "5G NR: The Next Generation Wireless Access Technology (1st. ed.)", Academic Press, Inc., USA, 2018.

[13] E. Dahlman, S. Parkvall and J. Skold, Physical-Layer Control Signalling, "5G NR: The Next Generation Wireless Access Technology (1st. ed.)", Academic Press, Inc., USA, 2018.

[14] E. Dahlman, S. Parkvall and J. Skold, Retransmission Protocols, "5G NR: The Next Generation Wireless Access Technology (1st. ed.)", Academic Press, Inc., USA, 2018.

[15] E. Dahlman, S. Parkvall and J. Skold, Scheduling, "5G NR: The Next Generation Wireless Access Technology (1st. ed.)", Academic Press, Inc., USA, 2018.

[16] A. Zaidi et al., "5G Physical Layer: Principles, Models and Technology Components (1st. ed.)," Academic Press, Inc., USA, 2018.

[17] K. Takeda et al., "Understanding the Heart of the 5G Air Interface: An Overview of Physical Downlink Control Channel for 5G New Radio (NR)," 2019.

[18] S. Ahmadi, 5G NR, New Radio Access Layer 2/3 Aspects and System Operation, "Architecture, Technology, Implementation, and Operation of 3gpp New Radio Standards.", Academic Press, 2019.

[19] S. Ahmadi, 5G NR, New Radio Access Physical Layer Aspects (Part 1), "Architecture, Technology, Implementation, and Operation of 3gpp New Radio Standards", Academic Press, 2019.

[20] S. Ahmadi, 5G NR, New Radio Access Physical Layer Aspects (Part 2), "Architecture, Technology, Implementation, and Operation of 3gpp New Radio Standards", Academic Press, 2019.

[21] S. Ahmadi, 5G NR, Operation in Unlicensed and Shared Spectrum, "Architecture, Technology, Implementation, and Operation of 3gpp New Radio Standards.", Academic Press, 2019.

[22] "TS 38.213 v16.1 Physical layer procedures for control," 2020.

[23] "TS 38.321 v16.0 Medium Access Control (MAC) protocol specification," 3GPP, 2020.

[24] A. Aijaz, "Packet Duplication in Dual Connectivity Enabled 5G Wireless Networks: Overview and Challenges," IEEE Communications Standards Magazine, pp. 20-28, 2019.

[25] S. Lagen and et al., "New Radio Beam-Based Access to Unlicensed Spectrum: Design Challenges and Solutions," IEEE Communications Surveys & Tutorial, pp. 8-37, 2020.

[26] "TS 37.340 v16.1 E-UTRA and NR Multi-connectivity Stage 2," 3GPP, 2020.

[27] "TS 38.331 v16.0 NR Radio Resource Control (RRC) protocol specification," 3GPP, 2020.

[28] "R2-1913296 Summary of email discussion 107 #31 NR DCCA Fast MCG Recovery," 2019.

[29] Ericsson, "R2-1910273 Fast MCG Recovery via SCells," 2019.

[30] Nokia, "R2-1909111 NR DCCA Fast Recovery with CA," 2019.

[31] "TS 38. 101-1 v16.2 User Equipment (UE) radio transmission and reception Part 1: Range 1 Standalone," 3GPP, 2019.

[32] "TS 38.533 v16.2 User Equipment (UE) conformance specification Radio Resource Management (RRM)," 3GPP, 2019.

The invention claimed is:

1. A user equipment for communication over a wireless network;

wherein the user equipment is configured for communicating with one or more wireless network nodes of the wireless network simultaneously over a first component carrier group comprising one or more primary component carriers and over a second component carrier group comprising one or more secondary component carriers;

wherein the user equipment is configured for exchanging portions of signaling data over each of the primary component carriers and portions of user data over each of the primary component carriers and over each of the secondary component carriers with the one or more wireless network nodes;

wherein the user equipment is configured for communicating with the one or more wireless network nodes of the wireless network using different operational modes;

wherein the user equipment is configured for exchanging the portions of the signaling data exclusively over the primary component carriers in a first operational mode of the different operational modes in a first operational phase;

wherein the user equipment is configured for exchanging a portion of the signaling data of a selected primary component carrier of the primary component carrier of the first component carrier group simultaneously over the selected primary component carrier and over a selected secondary component carrier of the secondary component carriers of the second component carrier group in a second operational mode of the different operational modes in a second operational phase subsequent to the first operational phase, wherein the second operational phase is initiated in case that a first trigger condition occurs;

wherein the user equipment is configured for using the selected secondary component carrier from the second operational phase in a third operational mode of the different operational modes in a third operational phase subsequent to the second operational phase as one of the primary component carriers, so that the selected secondary component carrier from the second operational phase is added to the primary component carriers of the first component carrier group and removed from secondary component carriers of the second component carrier group in the third operational phase, wherein the third operational phase is initiated in case that a second trigger condition occurs;

wherein the user equipment is configured for detecting an occurrence of the second trigger condition in the second operational phase at an end of a time interval starting at a beginning of the second operational phase; and wherein the user equipment is configured, in case that the occurrence of the second trigger condition is not detected at the end of the time interval, for initiating a fourth operational phase subsequent to the second operational phase by switching to the first operational mode and by transmitting a third switching information to one of the wireless network nodes over one of the primary component carriers, wherein the third switching information indicates that the user equipment is in the first operational mode.

2. The user equipment according claim 1, wherein the user equipment is configured for using the selected primary component carrier from the second operational phase in the third operational mode of the different operational modes in the third operational phase as one of the secondary component carriers, so that the selected primary component carrier from the second operational phase is added to the secondary component carriers of the second component carrier group and removed from primary component carriers of the first component carrier group in the third operational phase.

3. The user equipment according to claim 1, wherein the first trigger condition and/or the second trigger condition relate to a physical quality of at least some of the primary component carriers and/or to a physical quality of at least some of the secondary component carriers.

4. The user equipment according to claim 1, wherein the user equipment is configured for transmitting a capability information to one of the wireless network nodes in the first operational phase over one of the primary component carriers, wherein the capability information indicates that the user equipment is capable of operating in the second operational mode and in the third operational mode.

5. The user equipment according to claim 1, wherein the user equipment is configured for receiving a trigger information from one of the wireless network nodes in the first operational phase over one of the primary component carriers, wherein the trigger information indicates the first trigger condition and/or the second trigger condition.

6. The user equipment according to claim 5, wherein the user equipment is configured for transmitting a trigger confirmation information to one of the wireless network nodes in the first operational phase over one of the primary component carriers, wherein the trigger confirmation information indicates that the trigger information has been received by the user equipment.

7. The user equipment according to claim 1, wherein the user equipment is configured for receiving a selection information from one of the wireless network nodes in the first operational phase over one of the primary component carriers, wherein the selection information indicates which of the secondary component carriers of the second component carrier group is the selected secondary component carrier for the second operational mode or wherein the selection information indicates conditions for selecting the selected secondary component carrier for the second operational mode.

8. The user equipment according to claim 7, wherein the user equipment is configured for transmitting a selection confirmation information to one of the wireless network nodes in the first operational phase over one of the primary component carriers, wherein the selection confirmation information indicates that the selection information has been received by the user equipment.

9. The user equipment according to claim 1, wherein the user equipment is configured for receiving a configuration information from one of the wireless network nodes in the first operational phase over one of the primary component carriers, wherein the configuration information indicates a configuration of the selected secondary component carrier for the second operational mode.

10. The user equipment according to claim 1, wherein the user equipment is configured for detecting an occurrence of the first trigger condition in the first operational phase and, in case that the occurrence of the first trigger condition is detected, for initiating the second operational phase by switching to the second operational mode and by transmitting a first switching information to one of the wireless network nodes over one of the primary component carriers, wherein the first switching information indicates that the user equipment is in the second operational mode.

11. The user equipment according to claim 1, wherein the user equipment is configured, in case that the occurrence of the second trigger condition is detected at the end of the time interval, for initiating the third operational phase by switching to the third operational mode and by transmitting a second switching information to one of the wireless network nodes over one of the primary component carriers, wherein the second switching information indicates that the user equipment is in the third operational mode.

12. A method for operating a user equipment for communication over a wireless network;

wherein the user equipment is configured for communicating with one or more wireless network nodes of the wireless network simultaneously over a first component carrier group comprising one or more primary component carriers and over a second component carrier group comprising one or more secondary component carriers;

wherein the user equipment is configured for communicating with the one or more wireless network nodes of the wireless network using different operational modes; and wherein the user equipment is configured for exchanging portions of signaling data over each of the primary component carriers and portions of user data over each of the primary component carriers and over each of the secondary component carriers with the one or more wireless network nodes;

the method comprising:

operating the user equipment in a first operational mode of the different operational modes in a first operational phase, wherein in the first operational mode the portions of the signaling data are exclusively exchanged over the primary component carriers;

operating the user equipment in a second operational mode of the different operational modes in a second operational phase subsequent to the first operational phase, wherein in the second operational mode a portion of the signaling data of a selected primary component carrier of the primary component carriers of the first component carrier group is simultaneously exchanged over the selected primary component carrier and over a selected secondary component carrier of the secondary component carriers of the second component carrier group, wherein the second operational phase is initiated in case that a first trigger condition occurs; and operating the user equipment in a third operational mode of the different operational modes in a third operational phase subsequent to the second operational phase, wherein in the third operational mode the selected secondary component carrier from the second operational phase is used as one of the primary component carriers, so that the selected secondary component carrier from the second operational phase is added to the primary component carriers of the first component carrier group and removed from secondary component carriers of the second component carrier group in the third operational phase, wherein the third operational phase is initiated in case that a second trigger condition occurs;

wherein the user equipment is configured for detecting an occurrence of the second trigger condition in the second operational phase at an end of a time interval starting at a beginning of the second operational phase; and wherein the user equipment is configured, in case that the occurrence of the second trigger condition is not detected at the end of the time interval, for initiating a fourth operational phase subsequent to the second operational phase by switching to the first operational mode and by transmitting a third switching information to one of the wireless network nodes over one of the primary component carriers, wherein the third switching information indicates that the user equipment is in the first operational mode.

13. A non-transitory digital storage medium having stored thereon a computer program for performing a method for operating a user equipment for communication over a wireless network;

wherein the user equipment is configured for communicating with one or more wireless network nodes of the wireless network simultaneously over a first component carrier group comprising one or more primary component carriers and over a second component carrier group comprising one or more secondary component carriers;

wherein the user equipment is configured for communicating with the one or more wireless network nodes of the wireless network using different operational modes; and wherein the user equipment is configured for exchanging portions of signaling data over each of the primary component carriers and portions of user data over each of the primary component carriers and over each of the secondary component carriers with the one or more wireless network nodes;

the method comprising:

operating the user equipment in a first operational mode of the different operational modes in a first operational phase, wherein in the first operational mode the portions of the signaling data are exclusively exchanged over the primary component carriers;

operating the user equipment in a second operational mode of the different operational modes in a second operational phase subsequent to the first operational phase, wherein in the second operational mode a portion of the signaling data of a selected primary component carrier of the primary component carriers of the first component carrier group is simultaneously exchanged over the selected primary component carrier and over a selected secondary component carrier of the secondary component carriers of the second component carrier group, wherein the second operational phase is initiated in case that a first trigger condition occurs; and operating the user equipment in a third operational mode of the different operational modes in a third operational phase subsequent to the second operational phase, wherein in the third operational mode the selected secondary component carrier from the second operational phase is used as one of the primary component carriers, so that the selected secondary component carrier from the second operational phase is added to the primary component carriers of the first component carrier group and removed from secondary component carriers of the second component carrier group in the third operational phase, wherein the third operational phase is initiated in case that a second trigger condition occurs;

wherein the user equipment is configured for detecting an occurrence of the second trigger condition in the second operational phase at an end of a time interval starting at a beginning of the second operational phase; and wherein the user equipment is configured, in case that the occurrence of the second trigger condition is not detected at the end of the time interval, for initiating a fourth operational phase subsequent to the second operational phase by switching to the first operational mode and by transmitting a third switching information to one of the wireless network nodes over one of the primary component carriers, wherein the third switching information indicates that the user equipment is in the first operational mode, when said computer program is run by a computer.

14. A wireless network node for connecting a user equipment for communication over a wireless network to the wireless network;

wherein the wireless network node is configured for communicating with the user equipment simultaneously over a first component carrier group comprising one or more primary component carriers and over a second component carrier group comprising one or more secondary component carriers;

wherein the wireless network node is configured for communicating with the user equipment using different operational modes;

wherein the wireless network node is configured for exchanging portions of signaling data over each of the primary component carriers and portions of user data over each of the primary component carriers and over each of the secondary component carriers with the user equipment;

wherein the wireless network node is configured for exchanging the portions of the signaling data exclusively over the primary component carriers in a first operational mode of the different operational modes in a first operational phase;

wherein the wireless network node is configured for exchanging a portion of the signaling data of a selected primary component carrier of the primary component carriers of the first component carrier group simultaneously over the selected primary component carrier and over a selected secondary component carrier of the secondary component carriers of the second component carrier group in a second operational mode of the different operational modes in a second operational phase subsequent to the first operational phase, wherein the second operational phase is initiated in case that a first trigger condition occurs;

wherein the wireless network node is configured for using the selected secondary component carrier from the second operational phase in a third operational mode of the different operational modes in a third operational phase subsequent to the second operational phase as one of the primary component carriers, so that the selected secondary component carrier from the second operational phase is added to the primary component carriers of the first component carrier group and removed from secondary component carriers of the second component carrier group in the third operational phase, wherein the third operational phase is initiated in case that a second trigger condition occurs; and wherein the wireless network node is configured for using the selected primary component carrier from the second operational phase in the third operational mode in the third operational phase as one of the secondary component carriers, so that the selected primary component carrier from the second operational phase is added to the secondary component carriers of the second component carrier group and removed from primary component carriers of the first component carrier group in the third operational phase.

15. The wireless network node according to claim 14, wherein the wireless network node is configured for transmitting a trigger information to the user equipment in the first operational phase over one of the primary component carriers, wherein the trigger information indicates the first trigger condition and/or the second trigger condition.

16. The wireless network node according to claim 14, wherein the wireless network node is configured for transmitting a selection information to the user equipment in the first operational phase over one of the primary component carriers, wherein the selection information indicates which of the secondary component carriers of the second component carrier group is the selected secondary component carrier for the second operational mode or wherein the selection information indicates conditions for selecting the selected secondary component carrier for the second operational mode.

17. The wireless network node according to claim 14, wherein the wireless network node is configured for transmitting a configuration information to the user equipment in the first operational phase over one of the primary component carriers, wherein the configuration information indicates a configuration of the selected secondary component carrier for the second operational mode.

18. A method for operating a wireless network node for connecting a user equipment for communication over a wireless network to the wireless network;

wherein the wireless network node is configured for communicating with the user equipment simultaneously over a first component carrier group comprising one or more primary component carriers and over a second component carrier group comprising one or more secondary component carriers;

wherein the wireless network node is configured for communicating with the user equipment using different operational modes; and wherein the wireless network node is configured for exchanging portions of signaling data over each of the primary component carriers and portions of user data over each of the primary component carriers and over each of the secondary component carriers with the user equipment;

the method comprising:

operating the wireless network node in a first operational mode of the different operational modes in a first operational phase, wherein in the first operational mode the portions of the signaling data are exclusively exchanged over the primary component carriers;

operating the wireless network node in a second operational mode of the different operational modes in a second operational phase subsequent to the first operational phase, wherein in the second operational mode a portion of the signaling data of a selected primary component carrier of the primary component carriers of the first component carrier group is simultaneously exchanged over the selected primary component carrier and over a selected secondary component carrier of the secondary component carriers of the second component carrier group, wherein the second operational phase is initiated in case that a first trigger condition occurs; and operating the wireless network node in a third operational mode of the different operational modes in a third operational phase subsequent to the second operational phase, wherein in the third operational mode the selected secondary component carrier from the second operational phase is used as one of the primary component carriers, so that the selected secondary component carrier from the second operational phase is added to the primary component carriers of the first component carrier group and removed from secondary component carriers of the second component carrier group in the third operational phase, wherein the third operational phase is initiated in case that a second trigger condition occurs;

wherein the wireless network node is configured for using the selected primary component carrier from the second operational phase in the third operational mode in the third operational phase as one of the secondary component carriers, so that the selected primary component carrier from the second operational phase is added to the secondary component carriers of the second component carrier group and removed from primary component carriers of the first component carrier group in the third operational phase.

19. A non-transitory digital storage medium having stored thereon a computer program for performing a method for operating a wireless network node for connecting a user equipment for communication over a wireless network to the wireless network;

wherein the wireless network node is configured for communicating with the user equipment simultaneously over a first component carrier group comprising one or more primary component carriers and over a second component carrier group comprising one or more secondary component carriers;

wherein the wireless network node is configured for communicating with the user equipment using different operational modes; and wherein the wireless network node is configured for exchanging portions of signaling data over each of the primary component carriers and portions of user data over each of the primary component carriers and over each of the secondary component carriers with the user equipment;

the method comprising:

operating the wireless network node in a first operational mode of the different operational modes in a first operational phase, wherein in the first operational mode the portions of the signaling data are exclusively exchanged over the primary component carriers;

operating the wireless network node in a second operational mode of the different operational modes in a second operational phase subsequent to the first operational phase, wherein in the second operational mode a portion of the signaling data of a selected primary component carrier of the primary component carriers of the first component carrier group is simultaneously exchanged over the selected primary component carrier and over a selected secondary component carrier of the secondary component carriers of the second component carrier group, wherein the second operational phase is initiated in case that a first trigger condition occurs; and operating the wireless network node in a third operational mode of the different operational modes in a third operational phase subsequent to the second operational phase, wherein in the third operational mode the selected secondary component carrier from the second operational phase is used as one of the primary component carriers, so that the selected secondary component carrier from the second operational phase is added to the primary component carriers of the first component carrier group and removed from secondary component carriers of the second component carrier group in the third operational phase, wherein the third operational phase is initiated in case that a second trigger condition occurs;

wherein the wireless network node is configured for using the selected primary component carrier from the second operational phase in the third operational mode in the third operational phase as one of the secondary component carriers, so that the selected primary component carrier from the second operational phase is added to the secondary component carriers of the second component carrier group and removed from primary component carriers of the first component carrier group in the third operational phase, when said computer program is run by a computer.

* * * * *